(12) United States Patent
Islam et al.

(10) Patent No.: US 12,459,831 B2
(45) Date of Patent: Nov. 4, 2025

(54) [SN$_2$S$_6$]$^{4-}$ INTERCALATED LAYER DOUBLE HYDROXIDE AND METHOD OF PRODUCING THE SAME

(71) Applicant: Jackson State University, Jackson, MS (US)

(72) Inventors: Muhammad Saiful Islam, Madison, MS (US); Ahmet Celik, Nizip (TR)

(73) Assignee: Jackson State University, Jackson, MS (US)

( * ) Notice: Subject to any disclaimer, the term of this patent is extended or adjusted under 35 U.S.C. 154(b) by 0 days.

(21) Appl. No.: 17/669,201

(22) Filed: Feb. 10, 2022

(65) Prior Publication Data

US 2022/0250929 A1   Aug. 11, 2022

Related U.S. Application Data

(60) Provisional application No. 63/148,026, filed on Feb. 10, 2021.

(51) Int. Cl.
| | |
|---|---|
| *C01F 7/784* | (2022.01) |
| *B01J 20/04* | (2006.01) |
| *B01J 20/28* | (2006.01) |
| *B01J 20/30* | (2006.01) |
| *C02F 1/28* | (2023.01) |

(52) U.S. Cl.
CPC ............. *C01F 7/784* (2022.01); *B01J 20/041* (2013.01); *B01J 20/28033* (2013.01); *B01J 20/3071* (2013.01); *C02F 1/288* (2013.01); *C01P 2002/22* (2013.01); *C01P 2002/72* (2013.01)

(58) Field of Classification Search
CPC .... C01F 7/784; B01J 20/041; B01J 20/28033; B01J 20/3071; C01P 2002/22; C01P 2002/72; C01P 2002/08; C01P 2002/85; C01P 2004/03; C01P 2004/20
See application file for complete search history.

(56) References Cited

U.S. PATENT DOCUMENTS

2014/0097141 A1*  4/2014  Kanatzidis ............... B01J 39/09
                                                    252/175

OTHER PUBLICATIONS

Hibino et al. (Layered double hydroxide-agarose composites for water treatment: carbonate contamination during the drying process, Applied Clay Science, 2015) (Year: 2015).*
Chen et al([SnS4] 4-clusters modified MgAl-LDH composites for mercury ions removal from acid wastewater, Environmental Pollution, 2019) (Year: 2019).*
Oh et al (Selective Surfaces: High-Surface-Area Zinc Tin Sulfide Chalcogels, Chemistry of Materials, 2011) (Year: 2011).*
(Continued)

*Primary Examiner* — Sally A Merkling
*Assistant Examiner* — Logan Edward Laclair
(74) *Attorney, Agent, or Firm* — Butler Snow LLP

(57) ABSTRACT

A hybrid functionalized lamellar comprises a layered double hydroxide and [Sn$_2$S$_6$]$^{4-}$ anions intercalated with the gallery of the layered double hydroxide to form a [Sn$_2$S$_6$]$^{4-}$ intercalated layered double hydroxide.

5 Claims, 32 Drawing Sheets

(56) References Cited

OTHER PUBLICATIONS

Nobuo et al (One-step Conversion of CO32-LDH (Layered Double Hydroxide) into Anion-exchangeable LDHs Using an Acetate-buffer/Salt Method, Chemistry letters, 2010) (Year: 2010).*

Chen L, et al. [SnS4]4− clusters modified MgAl-LDH composites for mercury ions removal from acid wastewater. Environmental Pollution 247 (2019) pp. 146-154.

Ma L, et al. Highly Selective and Efficient Removal of Heavy Metals by Layered Double Hydroxide Intercalated with the MoS42−Ion. J. Am. Chem. Soc. 2016, 138, pp. 2858-2866.

Ma S, et al. Highly selective and efficient heavy metal capture with polysulfide intercalated layered double hydroxides. J. Mater. Chem. A, 2014, 2, pp. 10280-10289.

Jawad A, et al. Fe—MoS4: An Effective and Stable LDH-Based Adsorbent for Selective Removal of Heavy Metals. ACS Appl. Mater. Interfaces 2017, 9, pp. 28451-28463.

Ma S, et al. Efficient Uranium Capture by Polysulfide/Layered Double Hydroxide Composites. J. Am. Chem. Soc. 2015, 137, pp. 3670-3677.

Ma L, et al. Rapid Simultaneous Removal of Toxic Anions [HSeO3]−, [SeO3]2−, and [SeO4]2−, and Metals Hg2+, Cu2+, and Cd2+ by MoS42− Intercalated Layered Double Hydroxide. J. Am. Chem. Soc. 2017, 139, pp. 12745-12757.

\* cited by examiner

$[Sn_2S_6]^{4-}$ INTERCALATED LAYER DOUBLE HYDROXIDE AND METHOD OF PRODUCING THE SAME

CROSS-REFERENCE TO RELATED APPLICATIONS

This application claims priority to U.S. Application No. 63/148,026 to Islam et al. filed on Feb. 10, 2021, the contents of which are incorporated herein by reference in its entirety.

STATEMENT OF FEDERALLY SPONSORED RESEARCH OR DEVELOPMENT

This invention was made with government support under Contract MSIPP TOA/PO No. 0000456322 awarded by the U.S. Department of Energy. The government has certain rights in the invention.

FIELD

The present subject matter generally relates to $[Sn_2S_6]^{4-}$ intercalated layer double hydroxide and method of producing the same for treatment of heavy metals in water and other solutions.

BACKGROUND

Worldwide, currently more than one billion people lack access to clean and decontaminated drinking water. This leads to hundreds of millions of cases of water-related diseases and two to five million casualties each year. Among the different types of water contaminants, heavy metals pose severe concerns around the world because of their detrimental effects on humans and other biological systems. The rapid surge of industrialization, urbanization, mining, fossil fuel burning, as well as an exponential increase of the use of heavy metals, has resulted in their accelerated accumulation in freshwater in recent decades. Trace heavy metal cations such as mercury, lead, cadmium, silver, and copper commonly play a critical role in the contamination of water. Decontamination of water from these heavy metal ions is essential because of their severe cytotoxicity to biological systems including human health. Therefore, over the past decades, an intensive effort has been devoted to the development of techniques and sorbent materials for the remediation of trace heavy metal cations from wastewater.

BRIEF DESCRIPTION

Aspects and advantages of the invention will be set forth in part in the following description, or may be obvious from the description, or may be learned through practice of the invention.

According to some aspects of the present disclosure, a hybrid functionalized lamellar comprises a layered double hydroxide and $[Sn_2S_6]^{4-}$ anions intercalated with the gallery of the layered double hydroxide to form a $[Sn_2S_6]^{4-}$ intercalated layered double hydroxide, wherein the $[Sn_2S_6]^{4-}$ intercalated layered double hydroxide intercalated has a basal spacing of about 1 nm to about 1.10 nm.

According to some aspects of the present disclosure, a method of producing a $[Sn_2S_6]^{4-}$ intercalated layered double hydroxide comprising steps of synthesizing MgAl-LDH-$CO_3$, synthesizing MgAl-LDH-$NO_3$ by the exchange of $CO_3^{2-}$ anions by $NO_3$ anions, and synthesizing MgAl-LDH-$[Sn_2S_6]$ by the exchange of $NO_3$ anions by $[Sn_2S_6]^{4-}$ anions.

These and other features, aspects, and advantages of the present disclosure will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present disclosure, including the best mode thereof, directed to one of ordinary skill in the art, is set forth in the specification, which makes reference to the appended figures.

Figure 1:
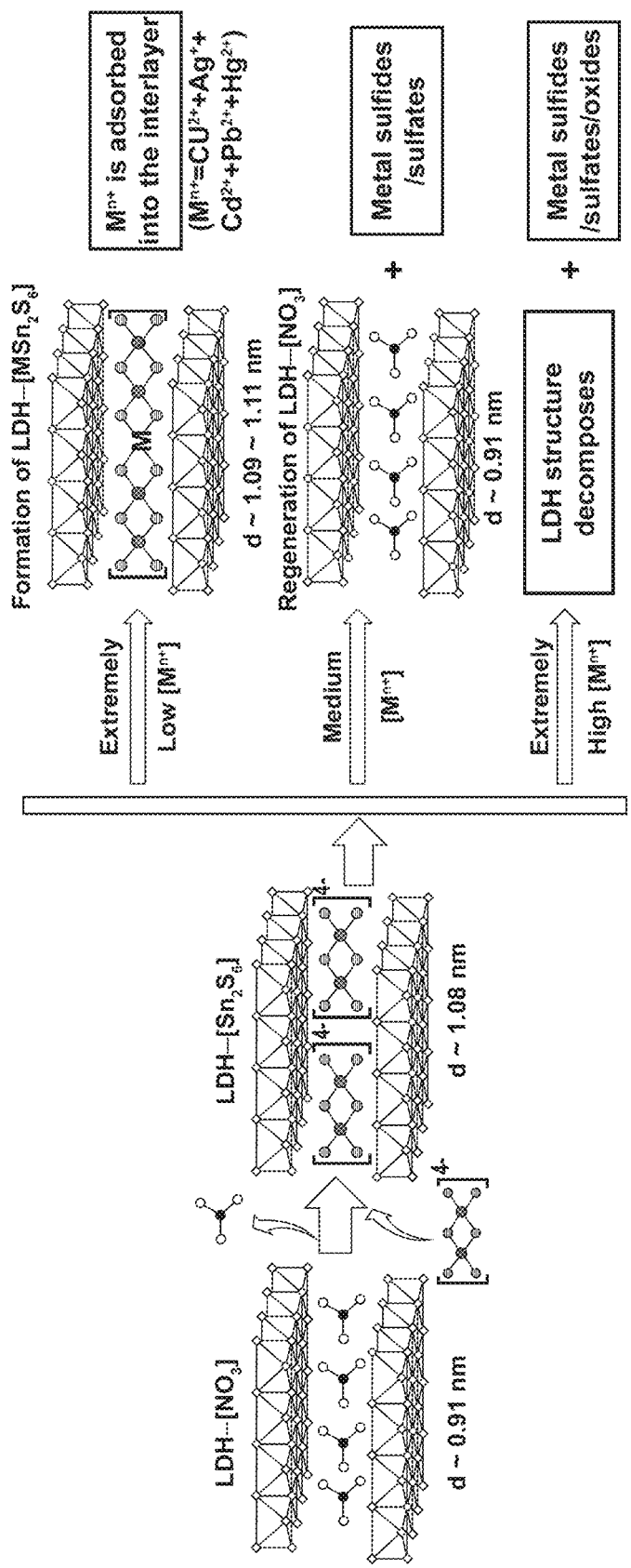
FIG. 1 shows a schematic of the ion-exchange of $NO_3^-$ with $Sn_2S_6^{4-}$ anions for the synthesis of LDH-$[Sn_2S_6]$, the proposed concentration-dependent $M^{n+}$ adsorption phenomena leading to the adsorption of $M^{n+}$ into the interlayered gallery, and the regeneration of LDH-$NO_3$ with settlement of the neutral metal sulfides species outside the LDH gallery.

Repeat use of reference characters in the present specification and drawings is intended to represent the same or analogous features or elements of the present disclosure.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first," "second," and "third" may be used interchangeably to distinguish one component from another and are not intended to signify location or importance of the individual components. The terms "coupled," "fixed," "attached to," and the like refer to both direct coupling, fixing, or attaching, as well as indirect coupling, fixing, or attaching through one or more intermediate components or features, unless otherwise specified herein.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," "generally," and "substantially," is not to be limited to the precise value specified. In at least some instances, the approximating language may correspond to the precision of an instrument for measuring the value, or the precision of the methods or apparatus for constructing or manufacturing the components and/or systems. For example, the approximating language may refer to being within a ten percent margin.

Moreover, the technology of the present application will be described with relation to exemplary embodiments. The word "exemplary" is used herein to mean "serving as an example, instance, or illustration." Any embodiment described herein as "exemplary" is not necessarily to be construed as preferred or advantageous over other embodiments. Additionally, unless specifically identified otherwise, all embodiments described herein should be considered exemplary.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

As used herein, the term "and/or," when used in a list of two or more items, means that any one of the listed items can be employed by itself, or any combination of two or more of the listed items can be employed. For example, if a composition or assembly is described as containing components A, B, and/or C, the composition or assembly can contain A alone; B alone; C alone; A and B in combination; A and C in combination; B and C in combination; or A, B, and C in combination.

The present disclosure is generally directed to a hybrid functionalized lamellar MgAl-LDH-[$Sn_2S_6$] (also referred to herein as LDH-[$Sn_2S_6$]) and a method for synthesizing the same. The intercalation of [$Sn_2S_6$]$^{4-}$ into the gallery of MgAl-LDH may increase the effectiveness for the removal of heavy metal ions such as $Co^{2+}$, $Ni^{2+}$, $Zn^{2+}$, $Cu^{2+}$, $Ag^+$, $Cd^{2+}$, $Pb^{2+}$ and $Hg^{2+}$ from aqueous solutions. As discussed elsewhere herein, use of LDH-[$Sn_2S_6$] may reduce the content of these heavy metal ions to contents below the WHO limit for drinking water. The extremely high sorption efficiencies, widespread selectivity, ultrafast sorption kinetics, wide range of pH stability, and reusability of LDH-

[Sn$_2$S$_6$] makes this material a promising sorbent for industrial-scale use for the decontamination of heavy metal polluted water.

The chemical formula of the hybrid functionalized lamellar is

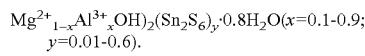
$$Mg^{2+}{}_{1-x}Al^{3+}{}_x(OH)_2(Sn_2S_6)_y \cdot 0.8H_2O \, (x=0.1-0.9;\, y=0.01-0.6).$$

It will be understood that, within the chemical formula provided, either Mg$^{2+}$ may be fully or partially substituted by Mn$^{2+}$, Fe$^{2+}$, Co$^{2+}$, Ni$^{2+}$, Cu$^{2+}$, Zn$^{2+}$, Eu$_{2+}$, Ag$^+$ or Al$^{3+}$ may be fully or partially substituted by M$^{3+}$=Al$^{3+}$, V$^{3+}$, Ti$^{3+}$, Cr$^{3+}$, Ga$^{3+}$, Fe$^{3+}$, Ni$^{3+}$, Co$^{3+}$, Sb$^{3+}$, Bi$^{3+}$, Eu$^{3+}$, Sc$^{3+}$. It will also be understood that, where either Mg$^{2+}$ or Al$^{3+}$ has been fully or partially substituted as described, [Sn$_2$S$_6$]$^{4-}$ can be partially or fully substituted by [Sn$_4$S$_{10}$]$^{4-}$, [Sn$_4$S$_9$]$^{2-}$, [Sn$_3$S$_7$·½S$_8$]$^{2-}$, [SnS$_{14}$]$^{2-}$, [Ge$_2$S$_6$]$^{4-}$, [Ge$_4$S$_{10}$]$^{4-}$, [Sn(Zn$_4$Sn$_4$S$_{17}$)]$^{6-}$, [Fe$_2$S$_2$(S$_5$)$_2$]$^{2-}$, [S$_5$Fe(MoS$_2$)]$^{2-}$, Ti$_2$S$_{14}$$^{4-}$, [CuS$_4$]$^-$, [CuS$_6$]$^-$, [SbS$_6$]$^-$, [M$_4$Sn$_4$S$_{17}$]$^{10-}$, (M=Mn$^{2+}$, Fe$^{2+}$, Co$^{2+}$, Zn$^{2+}$), [Sb$_6$S$_{17}$]$^{6-}$, [Sb$_4$S$_8$]$^{2-}$, [moS(S$_4$)$_2$]$^{2-}$, [Mo$_3$S(S$_2$)$_6$]$^{2-}$, [Mo$_2$(S$_2$)$_2$(S$_2$)$_4$]$^{2-}$, [Mo$_2$S$_2$(S$_2$)$_2$]$^{2-}$, [Mo$_2$S$_6$(S$_4$)]$^{2-}$, and [Mo$_2$S$_4$(S$_4$)$_2$]$^{2-}$.

The method for synthesizing the hybrid functionalized lamellar MgAl-LDH-[Sn$_2$S$_6$] (LDH-[Sn$_2$S$_6$]) includes a step of synthesizing MgAl-LDH-CO$_3$ (also referred to herein LDH-CO$_3$). In detail, to synthesize LDH-CO$_3$, a mixture of about 3.21 g Mg(NO$_3$)$_2$·6H$_2$O (0.0125 mol), about 2.34 g Al(NO$_3$)$_3$·9H$_2$O (0.006 mol), and about 2.28 g hexamethylenetetramine (HMT) are dissolved in about 50 mL deionized water (DIW).

Subsequently, the solution is hydrothermally treated at about 140° C. for about 24 hours in a hydrothermal autoclave reactor (e.g., a Teflon-autoclave). The as-prepared white precipitate of MgAl—CO$_3$-LDH (LDH-CO$_3$) is filtered, washed with DIW, and then dried under vacuum.

Another step may include synthesizing MgAl—NO$_3$-LDH (also referred to herein as LDH-NO$_3$) by the exchange of CO$_3$$^{2-}$ by NO$_3$$^-$. Specifically, to synthesize LDH-NO$_3$, about 127.5 g NaNO$_3$ and about 0.36 mL HNO$_3$ (65%-68%) are dissolved in about 1000 mL of DIW. Then, about 0.8 g of MgAl-LDH-CO$_3$ powder is added. The as-prepared mixture is sealed (e.g., the mixture may be sealed with Teflon) and is stirred for about 24 hours at room temperature. The resulting white solids are filtered, washed with DIW, and then vacuum-dried for about 24 hours.

The method may further include steps of obtaining white crystals of Na$_4$Sn$_2$S$_6$·14H$_2$O from a solution of about 14.4 g Na$_2$S·9H$_2$O and about 5.2 g SnCl$_4$·5H$_2$O in a refrigerator; filtering and washing the crystals of Na$_4$Sn$_2$S$_6$·14H$_2$O with acetone; and vacuum drying the crystals for about 24 hours. The [Sn$_2$S$_6$]$^{4-}$ anions of the Na$_4$Sn$_2$S$_6$·14H$_2$O are exchanged with NO$_3$$^-$ of the LDH-NO$_3$ to synthesize the LDH-[Sn$_2$S$_6$] in accordance with the equation:

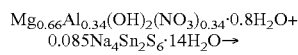
$$Mg_{0.66}Al_{0.34}(OH)_2(NO_3)_{0.34} \cdot 0.8H_2O + 0.085 Na_4Sn_2S_6 \cdot 14H_2O \rightarrow$$

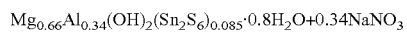
$$Mg_{0.66}Al_{0.34}(OH)_2(Sn_2S_6)_{0.085} \cdot 0.8H_2O + 0.34 NaNO_3$$

Another step may include synthesizing LDH-[Sn$_2$S$_6$] from LDH-NO$_3$. To synthesize LDH-[Sn$_2$S$_6$], about 0.25 g of LDH-NO$_3$ and about 0.75 g of Na$_4$Sn$_2$S$_6$·14H$_2$O are dispersed in about 50 mL DIW. The mixture is then stirred at ambient condition for about 24 hours, leading to the formation of a yellowish solution of suspended particles. Filtration is performed to obtain the yellow solids from the solution. After filtration, the yellow solids are then washed with ethanol and dried at room temperature (RT) and pressure. The resulting LDH-[Sn$_2$S$_6$] is synthesized at room temperature and pressure and is stable in air and water. LDH-[Sn$_2$S$_6$] has a chemical formula Mg$_{0.66}$Al$_{0.34}$(OH)$_2$(Sn$_2$S$_6$)$_{0.085}$·0.8H$_2$O. The molecular weight of LDH-[Sn$_2$S$_6$] is 110 g based on the chemical formula with a contribution from the Sn$_2$S$_6$ moiety of 36.53 g/mol.

FIG. 1 illustrates a schematic of an ion-exchange of NO$_3$$^-$ with Sn$_2$S$_6$$^{4-}$ anions for the synthesis of LDH-[Sn$_2$S$_6$], the proposed concentration-dependent M$^{n+}$ adsorption phenomena leading to the adsorption of M$^{n+}$ into the interlayered gallery, and the regeneration of LDH-NO$_3$ with settlement of the neutral metal sulfides species outside the LDH gallery.

EXAMPLES

The uptake (e.g., sorption) of heavy metal ions from aqueous solutions of various concentrations of Co$^{2+}$, Ni$^{2+}$, Cu$^{2+}$, Zn$^{2+}$, Ag$^+$, Cd$^{2+}$, Pb$^{2+}$, and Hg$^{2+}$ were performed at ambient conditions. The sorption experiments of the following examples were conducted using batch methods where the solid adsorbent, LDH-[Sn$_2$S$_6$], was mixed with the solutions of heavy metals for a certain time limit under vigorous stirring. After a certain period of interaction, the suspensions were centrifuged and the supernatant solutions were analyzed for the heavy metals using inductively coupled plasma-mass spectrometry (ICP-MS). The adsorption efficiencies were calculated from the difference in the concentration of the metal cations before and after sorption.

The distribution coefficient ($K_d$) in adsorption experiments was used to determine the affinity of LDH-[Sn$_2$S$_6$] for heavy metals. The $K_d$ is defined by the equation: $K_d = (V[(C_0 - C_f)/C_f])/m$; where V is the solution volume (mL), C$_0$ and C$_f$ correspond to the initial and the final concentrations of the metal cations, M$^{n+}$ (M$^{n+}$=Co$^{2+}$, Ni$^{2+}$, Cu$^{2+}$, Zn$^{2+}$, Ag$^+$, Cd$^{2+}$, Pb$^{2+}$, and Hg$^{2+}$) in ppm (mg/L), and m is the mass of the solid sorbent (g). The removal rate of M$^{n+}$ was computed using the equation of $100 \times (C_0 - C_f)/C_0$. The removal capacity, $q_m$ (mg/g) can be obtained from the equation: $10^{-3} \times (C_0 - C_f) V/m$. The adsorption experiments were carried out with V:m ratios of 1000 mL/g, at RT, and at different time scales ranging from min to several h.

Comparative Example 1

For comparison to sorption results from Example 2 and detailed in Table 1B discussed below, an uptake study of the heavy metal ions (M$^{n+}$=Co$^{2+}$, Ni$^{2+}$, Cu$^{2+}$, Zn$^{2+}$, Ag$^+$, Cd$^{2+}$, Pb$^{2+}$, and Hg$^{2+}$) was conducted using the batch method at ambient conditions with LDH-NO$_3$ as the sorbent. About 10 mg of LDH-NO$_3$ sorbent material was suspended into solutions of M$^{n+}$. The initial concentration of each of the ions was 10 ppm or 10×10$^3$ ppb. The contact time was about three hours. The volume of the solution was about 10 mL with a pH of about 7. The mass of the solid sample for the experiment was about 0.010 grams such that the V/m ration of the sample was about 1000 mL/g. The supernatant solutions were analyzed by ICP-MS to determine the remaining concentrations of M$^{n+}$ after adsorption by LDH-NO$_3$. Results of the adsorption study of the affinity of LDH-NO$_3$ toward each of the eight exemplary heavy metal ions are detailed in Table 1A below. The results of Table 1A are labeled according to the single ion being tested.

TABLE 1A

| Ions | Initial (pre-adsorption) concentration ($C_i$) (ppm) | Final (post-adsorption) concentration ($C_f$) (ppm) | $M^{n+}$ removal (%) | $K_d$ (mL/g) |
|---|---|---|---|---|
| $Co^{2+}$ | 10.00 | 9.81 | 1.86 | $1.90 \times 10^1$ |
| $Ni^{2+}$ | 10.00 | 9.84 | 1.56 | $1.58 \times 10^1$ |
| $Zn^{2+}$ | 10.00 | 9.81 | 1.88 | $1.91 \times 10^1$ |
| $Cu^{2+}$ | 10.00 | 7.40 | 26.02 | $3.52 \times 10^2$ |
| $Ag^+$ | 10.00 | 7.65 | 23.51 | $3.07 \times 10^2$ |
| $Cd^{2+}$ | 10.00 | 8.74 | 12.60 | $1.44 \times 10^2$ |
| $Pb^{2+}$ | 10.00 | 7.85 | 21.47 | $2.73 \times 10^2$ |
| $Hg^{2+}$ | 10.00 | 7.82 | 21.80 | $2.79 \times 10^2$ |

Example 1

Figure 2A:
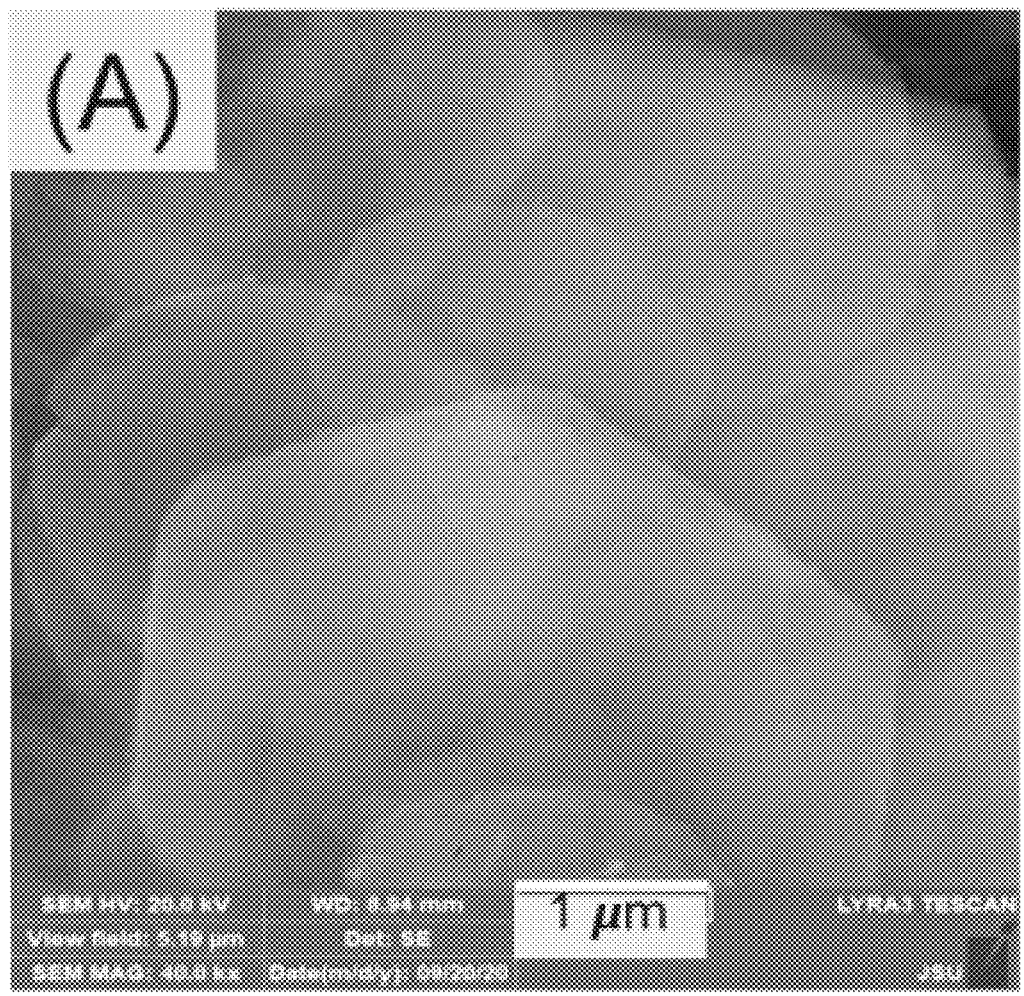
FIG. 2A shows an SEM image of the pristine LDH-$NO_3$.
Figure 2B:
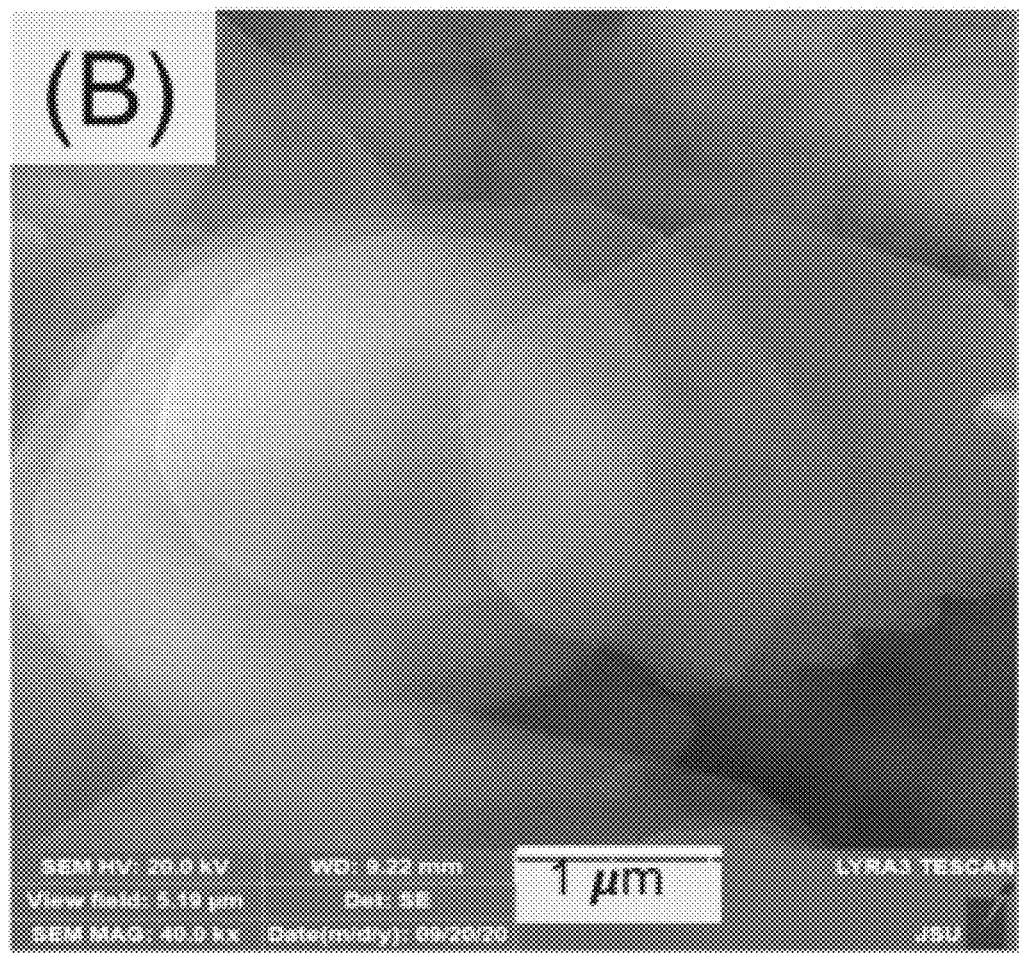
FIG. 2B shows an SEM image of LDH-$[Sn_2S_6]$.

To confirm the intercalation of $[Sn_2S_6]^{4-}$ anions into the gallery of MgAl-LDH the as-synthesized material was characterized by energy dispersive X-ray spectroscopy (EDS), scanning electron microscopy (SEM), X-ray powder diffraction (XRD), Raman spectroscopy, X-ray photoelectron spectroscopy (XPS), and solid-state UV/Vis optical reflectance. Energy dispersive X-ray spectroscopy showed the presence of Sn and S in addition to Mg and Al in the LDH-$Sn_2S_6$. An average atomic abundance of Sn and S was determined at about 5.17% and about 15.90%, respectively, which is equivalent to a Sn:S ratio of about 1.0:3.08. This value is close to that expected for $Sn_2S_6^{4-}$. Scanning electron microscopic (SEM) observations provide evidence of the retention of the plate like morphology even after the ion-exchange of the LDH-$NO_3$ with $[Sn_2S_6]^{4-}$ shown in FIG. 1. This kind of retention of the morphology after the metal sulfides anion exchange was also observed for polysulfides, $S_x$ and $MoS_4^{2-}$ intercalated LDH. SEM images of the pristine LDH-$NO_3$ (FIG. 2A) and LDH-$[Sn_2S_6]$ (FIG. 2B) show well crystalline plate-like morphology of the crystallites.

Figure 3A:
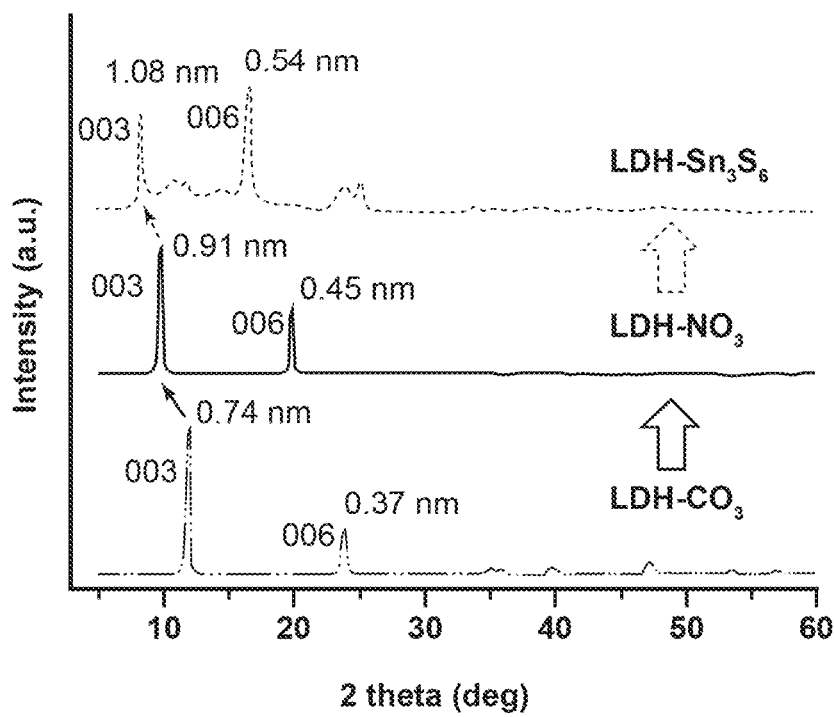
FIG. 3A shows a graphical representation of XRD patterns of the LDH-$CO_3$, LDH-$NO_3$ and LDH-$Sn_2S_6$ showing the shift 003 and 006 peaks at lower Bragg angles with respect to the size of the intercalated anions of $CO_3^{2-}$, $NO_3^-$ and $Sn_2S_6^{4-}$.

The evidence of the intercalation of $[Sn_2S_6]^{4-}$ into the layers of LDH was further investigated by XRD. A comparable feature of the XRD patterns of $CO_3^{2-}$, $NO_3^-$, and $[Sn_2S_6]^{4-}$ intercalated LDH is illustrated in FIG. 3A showing the shift 003 and 006 peaks at lower Bragg angles with respect to the size of the intercalated anions of $CO_3^{2-}$, $NO_3^-$ and $Sn_2S_6^{4-}$. The ion-exchange of $CO_3^{2-}$ by $NO_3^-$, and subsequently by $[Sn_2S_6]^{4-}$ led to a shift of the LDH's basal spacing ($d_{basal}$) from about 0.74 nm to about 0.91 to about 1.08 nm, respectively. In other words, basal, the $[Sn_2S_6]^{4-}$ intercalated layered double hydroxide intercalated has a basal spacing of about 1 nm to about 1.10 nm. Such an increase in the basal spacing is due to the expansion of the unit cell parameter along the 001 crystallographic plane. Such an enlargement of the unit cell is in agreement with the intercalation of larger $[Sn_2S_6]^{4-}$ anions into the LDH. Intercalation of the $[Sn_2S_6]$ into the LDH led to the color change of the samples from white (LDH-$NO_3$) to yellow (LDH-$[5n2S_6]$). Solid-state optical absorption spectroscopy reveals that LDH-$[Sn_2S_6]$ is a wide band gap semiconductor with an energy of ~3.0 eV, as shown in FIG. 3C. FIG. 3C further illustrates the optical bandgap energy for LDH-$[Sn_2S_6]$.

Figure 4:
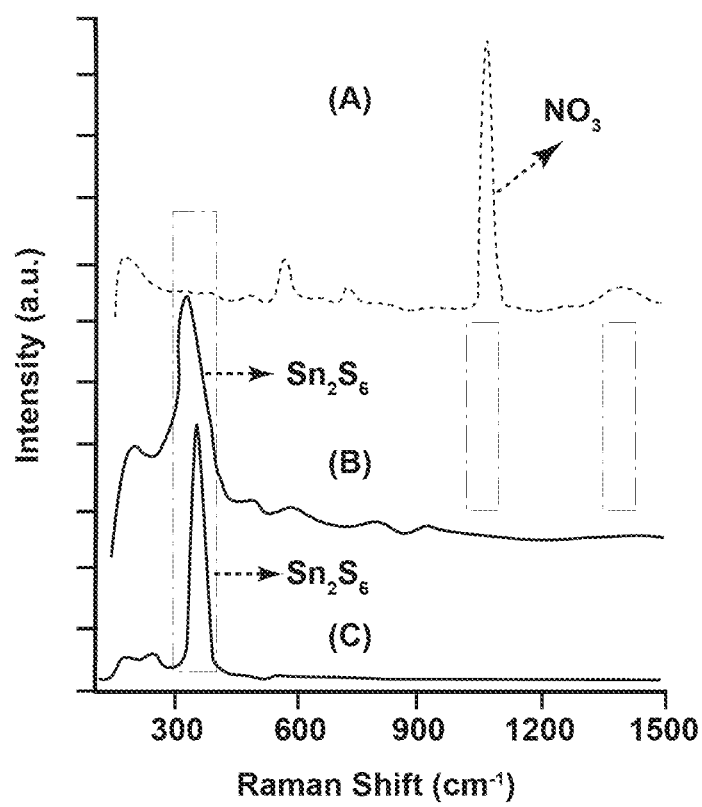
FIG. 4 shows a graphical representation of the Raman spectra of $Na_4Sn_2S_6 \cdot 14H_2O$; LDH-$Sn_2S_6$ and the LDH-$NO_3$.

The ion-exchange of the nitrate by $[Sn_2S_6]^{4-}$ was further confirmed by Raman spectroscopy, as shown in FIG. 4. A comparable feature of the Raman spectra of $Na_4Sn_2S_6$, LDH-$[NO_3]$, and LDH-$[Sn_2S_6]$ is shown in FIG. 4 and shows the intercalation of $Sn_2S_6$ in the nitrate LDH. For the pristine $Na_4Sn_2S_6$, a series of vibrational bands were assigned at 163 cm$^{-1}$ (Na—S), 248 cm$^{-1}$ (Na—S), 355 cm$^{-1}$ (Sn—S) with the Sn—S band being the strongest. For LDH-$[Sn_2S_6]$, a strong band centered at 325 cm$^{-1}$ is present while this peak is completely absent in the LDH-$[NO_3]$. This further validates the incorporation of $[Sn_2S_6]$ anions into the LDH. However, a slight shift of the bands can be attributed to the different chemical interactions of $Sn_2S_6$ anions with positively charged LDH layers. The 1062 and 772 cm$^{-1}$ bands in LDH-$NO_3$ are completely absent in the LDH-$[Sn_2S_6]$ demonstrating the complete ion-exchange. In addition, bands at about 180 and 555 cm$^{-1}$ for the LDH-$[NO_3]$ and LDH-$[Sn_2S_6]$ can be assigned as (M-O) and (OH-M), respectively. A small shift in the vibrational energy can be demonstrated as the chemical impact of the different anions.

Figure 3B:
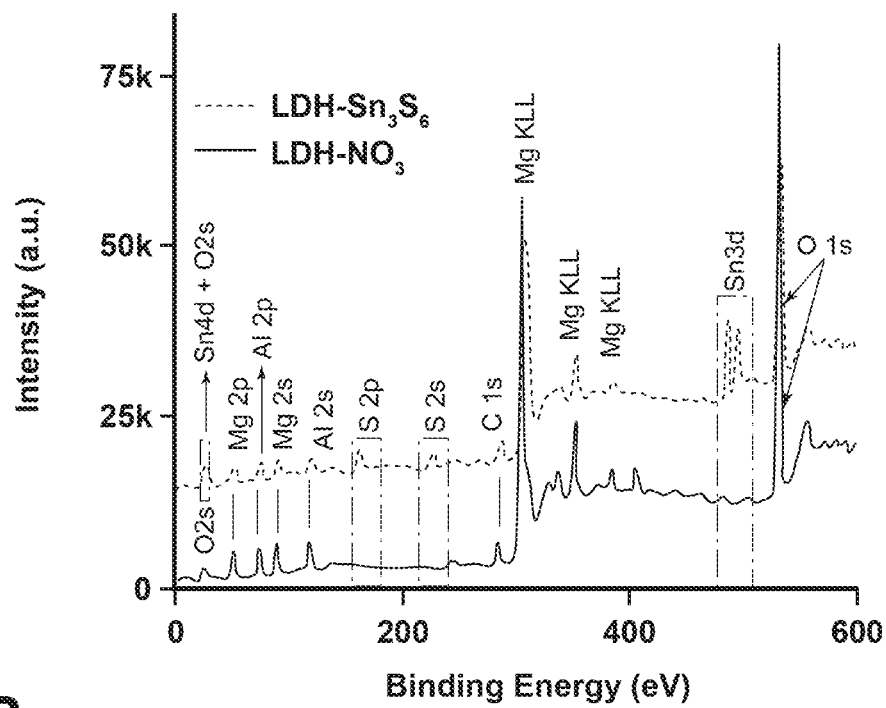
FIG. 3B shows a graphical representation of XPS of the LDH-$NO_3$ and LDH-$[Sn_2S_6]$ confirm the presence tin and sulfur in the LDH-$[Sn_2S_6]$.
Figure 3C:
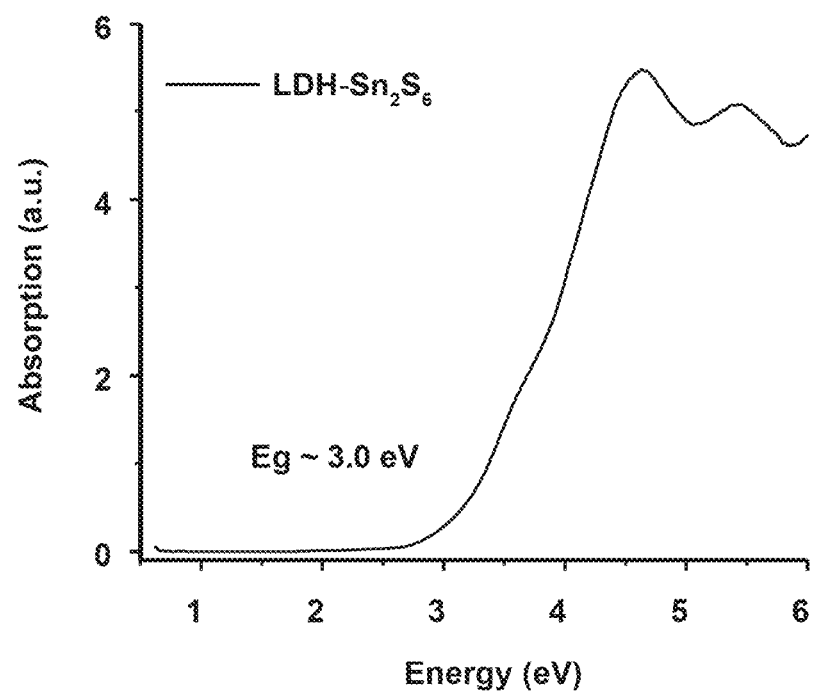
FIG. 3C shows a graphical representation of a solid state optical absorption spectrum of light powder of LDH-$[Sn_2S_6]$.

As shown in FIG. 3B, XPS of the LDH-$NO_3$ and LDH-$[Sn_2S_6]$ confirm the presence tin and sulfur in the LDH-$[Sn_2S_6]$. The XPS spectra of the LDH-$[Sn_2S_6]$ also revealed the existence of Sn and S with intense bands corresponding to binding energy (BEs) ranges of about 157 eV to about 163 eV and about 482 eV to about 495 eV, respectively. The bands at about 485.4 eV and about 493.8 eV are consistent with the $3d_{3/2}$ and $3d_{5/2}$ energy levels of Se. The splitting of the 3d energy band of Se is due to the presence of strong spin-orbital coupling. In addition, the BE of the bands at about 158.2 eV, about 159.5 eV, about 160.3 eV, and about 161.5 eV suggest the presence of $S^{2-}$ ions in the LDH-$[Sn_2S_6]$. The two sets of $S^{2-}$ peaks may be indicative of the different chemical interactions of $S^{2-}$ with the LDH layer hydroxides, such as by Sn—S . . . HO hydrogen bonding involving the hydroxide ions of the LDH layers. The binding energies of the Sn 3d and S 2p show the presence of the $Sn^{4+}$ and $S^{2-}$ oxidation states of $[Sn_2S_6]^{4-}$ confirming its presence in the LDH structure. Photoelectron bands at about 89.2 eV and about 74.4 eV for LDH-$NO_3$ represent Mg 2s and Al 2p, respectively. In contrast, LDH-$Sn_2S_6$ displays Mg 2s and Al 2p at about 86.6 eV and about 73.4 eV, respectively. This, as well as the results detailed in Example 2 below, illustrates that the metal sulfide functionalized LDH (LDH-$Sn_2S_6$) exhibits superior heavy metal remediation properties as compared to the oxoanion intercalated LDH (LDH-$NO_3$).

Example 2

The uptake study of the heavy metal ions ($M^{n+}=Co^{2+}$, $Ni^{2+}$, $Cu^{2+}$, $Zn^{2+}$, $Ag^+$, $Cd^{2+}$, $Pb^{2+}$, and $Hg^{2+}$) was conducted using the batch method at ambient conditions. To determine the affinity of LDH-$[Sn_2S_6]$ toward the $M^{n+}$ cations, about 10 mg of LDH-$[Sn_2S_6]$ sorbent material was suspended into solutions of $M^{n+}$. The initial concentration of each of the ions was 10 ppm or $10 \times 10^3$ ppb. The contact time was about three hours. The volume of the solution was about 10 mL with a pH of about 7. The mass of the solid sample for the experiment was about 0.010 grams such that the V/m ration of the sample was about 1000 mL/g. The supernatant solutions were analyzed by ICP-MS to determine the remaining concentrations of $M^{n+}$ after adsorption by LDH-$[Sn_2S_6]$. The batch method experiments were run five times for each ion listed in Table 1B below. An average of the results of the five runs of the adsorption study of the affinity of LDH-$[Sn_2S_6]$ toward each of the eight exemplary heavy metal ions are detailed in Table 1B below. The results of Table 1B are labeled according to the single ion being tested.

TABLE 1B

| Ions | Initial (pre-adsorption) concentration ($C_i$) (ppb) | Final (post-adsorption) concentration ($C_f$) (ppb) | $M^{n+}$ removal (%) | $K_d$ (mL/g) |
|---|---|---|---|---|
| $Co^{2+}$ | $10 \times 10^3$ | $9.5 \times 10^3$ | 4.55 | $4.76 \times 10^1$ |
| $Ni^{2+}$ | $10 \times 10^3$ | $9.4 \times 10^3$ | 6.01 | $6.40 \times 10^1$ |
| $Zn^{2+}$ | $10 \times 10^3$ | $0.62 \times 10^3$ | 93.79 | $1.51 \times 10^4$ |
| $Cu^{2+}$ | $10 \times 10^3$ | 4.4 | 99.96 | $2.27 \times 10^6$ |
| $Ag^+$ | $10 \times 10^3$ | 1.3 | 99.99 | $7.69 \times 10^6$ |
| $Cd^{2+}$ | $10 \times 10^3$ | 1.0 | 99.99 | $1.0 \times 10^7$ |
| $Pb^{2+}$ | $10 \times 10^3$ | 2.0 | 99.98 | $5.0 \times 10^6$ |
| $Hg^{2+}$ | $10 \times 10^3$ | 1.0 | 99.99 | $1.0 \times 10^7$ |

As seen in Table 1B, LDH-[$Sn_2S_6$] can adsorb over 99.9% of $Cu^{2+}$, $Ag^+$, $Cd^{2+}$, $Pb^{2+}$, and $Hg^{2+}$ from 10 ppm (mg/L) solutions of each cation. Such outstanding removal of $Cu^{2+}$, $Ag^+$, $Cd^{2+}$, $Pb^{2+}$, and $Hg^{2+}$ yielded final concentrations of about 4 ppb of $Cu^{2+}$, about 1 ppb of $Ag^+$, about 1 ppb of $Cd^{2+}$, about 2 ppb of $Pb^{2+}$, and about 1 ppb of $Hg^{2+}$, which are all well below US, EPA, and WHO limits for drinking water. Moreover, LDH-[$Sn_2S_6$] exhibits a distribution constant ($K_d$) of about $10^4$ mL/g for $Zn^{2+}$ and greater than $10^6$ mL/g for $Cu^{2+}$, $Ag^+$, $Cd^{2+}$, $Pb^{2+}$, and $Hg^{2+}$. $K_d$ represents the affinity of a sorbent toward a species, and a value of $\geq 10^4$ mL/g is considered outstanding. Hence, LDH-[$Sn_2S_6$] with such an excellent removal capacity, unprecedented selectivity toward a large number cations ($Zn^{2+}$, $Cu^{2+}$, $Ag^+$, $Cd^{2+}$, $Pb^{2+}$, and $Hg^{2+}$) and outstanding $K_d$ place this material as a top candidate for the sorption of heavy metals from aqueous solutions.

Example 3

To determine the selective affinity and the competitive sorption of trace heavy metal cations, a solution that contained $M^{n+}$=$Co^{2+}$, $Ni^{2+}$, $Cu^{2+}$ p, $Zn^{2+}$, $Ag^+$, $Cd^{2+}$, $Pb^{2+}$, and $Hg^{2+}$ together, which is referred to as mixed-ion states, was used. A solution of 10 ppm for each of eight cations results in a total concentration of 80 ppm. About 10 mg of LDH-[$Sn_2S_6$] sorbents were suspended into the mixed-ion states solution. The sorption experiment was conducted at pH about 7 for a contact time of about three hours. The volume of the solution was about 10 mL. The mass of the solid sample for the experiment was about 0.010 grams such that the V/m ration of the sample was about 1000 mL/g. Results of the adsorption study of the affinity of LDH-[$Sn_2S_6$] toward each of the eight exemplary heavy metal ions in the mixed-ion states solution are detailed in Table 2 below.

As shown in Table 2, even in the presence of mixed-competing ions, the affinity and the removal capacity of the sorbent was as high as for the individual cations $Cu^{2+}$, $Ag^+$, $Cd^{2+}$, $Pb^{2+}$, and $Hg^{2+}$. The final concentrations of each of these cations was as low as about 5 ppb. In other words, the removal capacity of LDH-[$Sn_2S_6$] in the mixed-ion states is over 99.9%, and $K_d$ values reach about $10^6$ mL/g for each of $Cu^{2+}$, $Ag^+$, $Cd^{2+}$, $Pb^{2+}$ and $Hg^{2+}$. At these concentrations, the selectivity order for these ions was $Zn^{2+}$, $Co^{2+}$, $Ni^{2+}$ << $Ag^+$, $Cu^{2+}$ < $Hg^{2+}$ < $Pb^{2+}$, $Cd^{2+}$. This indicates that LDH-[$Sn_2S_6$] exhibits concurrent removal of a large number of heavy metals ions ($Cu^{2+}$, $Ag^+$, $Pb^{2+}$, and $Hg^{2+}$), excellent $K_d$ values, and ultrahigh removal capacity.

TABLE 2

| Mixed-ions | Pre-adsorption concentration ($C_i$) (ppm) | Post-adsorption concentration ($C_f$) (ppm) | $M^{n+}$ removal (%) | $K_d$ (mL/g) |
|---|---|---|---|---|
| $Co^{2+}$ | 10 | 9.91 | 0.90 | $0.91 \times 10^2$ |
| $Ni^{2+}$ | 10 | 9.90 | 1.00 | $1.01 \times 10^1$ |
| $Zn^{2+}$ | 10 | 9.45 | 5.50 | $5.82 \times 10^1$ |
| $Cu^{2+}$ | 10 | 0.005 | 99.95 | $2.00 \times 10^6$ |
| $Ag^+$ | 10 | 0.005 | 99.95 | $2.00 \times 10^6$ |
| $Cd^{2+}$ | 10 | 0.001 | 99.99 | $1.00 \times 10^7$ |
| $Pb^{2+}$ | 10 | 0.001 | 99.99 | $1.00 \times 10^7$ |
| $Hg^{2+}$ | 10 | 0.004 | 99.96 | $2.50 \times 10^6$ |

A comparison of the adsorption data for the individual and mixed cation experiments of Example 3 demonstrates that at neutral pH, LDH-$Sn_2S_6$ is similarly effective in both systems for $Cu^{2+}$, $Ag^+$, $Cd^{2+}$, $Pb^{2+}$, and $Hg^{2+}$. However, the results of Example 3 show the adsorption of $Zn^{2+}$ dropped from about 94% ($K_d$~$1.5 \times 10^4$) to about 6% ($5.5 \times 10^1$ mL/g) from the individual to mixed cations systems. This may suggest that the $Zn^{2+}$ cations are less selective for the LDH-$Sn_2S_6$. This could be due to its higher chemical hardness and thus lower affinity for the chemically soft and polarizable sulfide anions. Overall, the sorption efficiencies indicated by the results of Example 3 establish LDH-[$Sn_2S_6$] as a highly promising adsorbent for the removal of heavy metals from complex samples, such as wastewater treatment.

Example 4

The adsorption of LDH-[$Sn_2S_6$] was also tested at pH ranging from about 2 to about 12 to determine the stability as well as the sorption efficiencies for $Cu^{2+}$, $Ag^+$, $Cd^{2+}$, $Pb^{2+}$, and $Hg^{2+}$ ions. This experiment was conducted using 3 hour interactions between cation solutions sorbents. The volume of the solution was about 10 mL, and the mass of the solid sample for the experiment was about 0.010 grams such that the V/m ration of the sample was about 1000 mL/g. Results for this experiment are detailed in Table 3 below.

Figure 5:
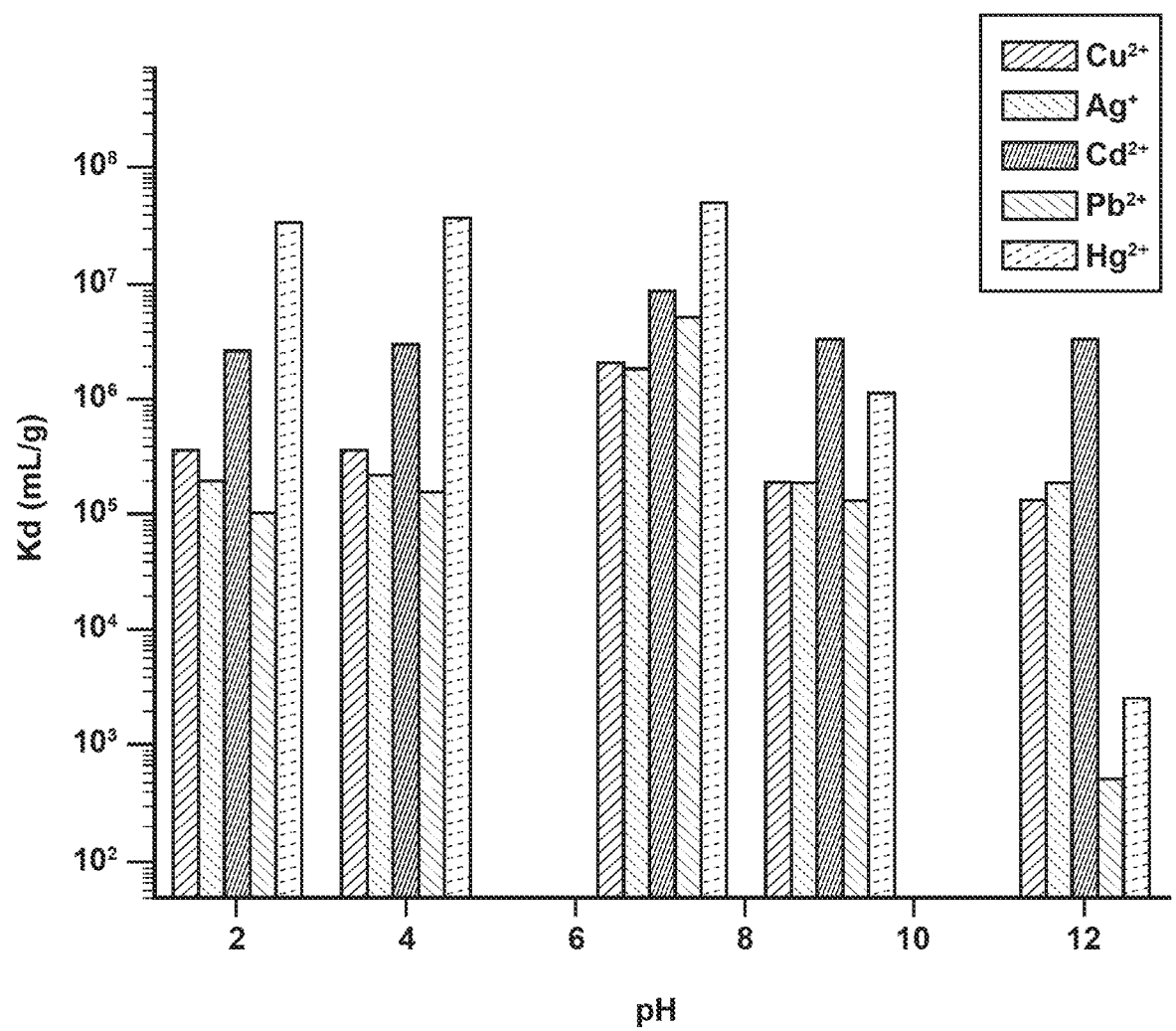
FIG. 5 shows a graphical representation of distribution constants, $K_d$, versus pH for $Cu^{2+}$, $Ag^+$, $Cd^{2+}$, $Pb^{2+}$, and $Hg^{2+}$ in acidic, alkaline, and neutral media.

As shown in FIG. 5, which illustrates the distribution constants, $K_d$, relative to the pH of the samples of experiments of Example 4, LDH-[$Sn_2S_6$] can efficiently capture these cations within the pH range of about 2 to about 12. The graph of FIG. 5 illustrates the sorption efficiencies of $Cu^{2+}$, $Ag^+$, $Cd^{2+}$, $Pb^{2+}$, and $Hg^{2+}$ in acidic, alkaline, and neutral media.

A detailed analysis of the results of Example 4 shows that LDH-[$Sn_2S_6$] is the most efficient at adsorption of $Cu^{2+}$, $Ag^+$, $Cd^{2+}$, $Pb^{2+}$, and $Hg^{2+}$ ions at a pH of about 7. At this pH, it achieves ≥99.9% removal of each cation with $K_d$ values >$10^6$ mL/g. At a pH of about 2, $K_d$ values for $Cu^{2+}$, $Ag^+$, and $Pb^{2+}$ decrease about one order of magnitude, and their removal rates decrease to about 99.7, about 99.5, and about 99.0%, respectively. In contrast, $K_d$ values remain >$10^7$ mL/g for $Hg^{2+}$ in the pH range of about 2 to about 7. The $K_d$ and removal rate for $Cd^{2+}$ remain at about $10^6$ mL/g and >99.9%, respectively, over the pH range of about 2 to about 12. At a pH of about 12, Example 4 yielded similar results for the absorption of $Cu^{2+}$ and $Ag^+$ (about 99.0% with $K_d$ values of about $10^5$ mL/g). The removal rate of $Hg^{2+}$ remains over 99.9% in the pH range of about 2 to about 9 but decreases to about 72% at a pH of about 12. The removal rate of $Pb^{2+}$ varies from about 99% ($K_d$~$10^5$ mL/g) at a pH of about 2 to about 33% ($K_d$~$5.2 \times 10^2$ mL/g) at a pH of about 12. The decreased removal rates of $Pb^{2+}$ and $Hg^{2+}$ at higher pH may be related to the gradual hydrolysis of the LDH. In contrast, the higher removal of $Cu^{2+}$, $Ag^+$, and $Cd^{2+}$ at a pH of about 12 may be a co-operative effect of both the adsorption and metal hydroxide precipitation. The high removal capacities and remarkably high distribution constants shown in Example 4 reveal LDH-[Sn$_2$S$_6$] as an excellent sorbent for the adsorption of heavy metals ions from acidic, alkaline, and neutral wastewater.

TABLE 3

| Single ions | pH | Pre-adsorption concentration (C$_i$) (ppm) | Post-adsorption concentration (C$_f$) (ppm) | M$^{n+}$ removal (%) | K$_d$ (mL/g) |
|---|---|---|---|---|---|
| Cu$^{2+}$ | pH 2 | 10 | 0.0289 | 99.71 | 3.45 × 10$^5$ |
| | pH 4 | 10 | 0.0273 | 99.73 | 3.65 × 10$^5$ |
| | pH 7 | 10 | 0.0049 | 99.95 | 2.05 × 10$^6$ |
| | pH 9 | 10 | 0.0535 | 99.47 | 1.86 × 10$^5$ |
| | pH 12 | 10 | 0.0754 | 99.25 | 1.32 × 10$^5$ |
| Ag$^+$ | pH 2 | 10 | 0.0523 | 99.48 | 1.90 × 10$^5$ |
| | pH 4 | 10 | 0.0466 | 99.53 | 2.14 × 10$^5$ |
| | pH 7 | 10 | 0.0014 | 99.99 | 7.14 × 10$^6$ |
| | pH 9 | 10 | 0.0522 | 99.48 | 1.91 × 10$^5$ |
| | pH 12 | 10 | 0.0545 | 99.46 | 1.82 × 10$^5$ |
| Cd$^{2+}$ | pH 2 | 10 | 0.0038 | 99.96 | 2.63 × 10$^6$ |
| | pH 4 | 10 | 0.0035 | 99.97 | 2.86 × 10$^6$ |
| | pH 7 | 10 | 0.0012 | 99.99 | 8.69 × 10$^6$ |
| | pH 9 | 10 | 0.0033 | 99.97 | 3.22 × 10$^6$ |
| | pH 12 | 10 | 0.0031 | 99.97 | 3.03 × 10$^6$ |
| Pb$^{2+}$ | pH 2 | 10 | 0.0970 | 99.03 | 1.02 × 10$^5$ |
| | pH 4 | 10 | 0.0625 | 99.38 | 1.59 × 10$^5$ |
| | pH 7 | 10 | 0.0020 | 99.98 | 5.10 × 10$^6$ |
| | pH 9 | 10 | 0.0766 | 99.23 | 1.30 × 10$^5$ |
| | pH 12 | 10 | 6.6574 | 33.43 | 5.02 × 10$^2$ |
| Hg$^{2+}$ | pH 2 | 10 | 0.0003 | ~100.00 | 3.33 × 10$^7$ |
| | pH 4 | 10 | 0.00028 | ~100.00 | 3.57 × 10$^7$ |
| | pH 7 | 10 | 0.0002 | ~100.00 | 5.0 × 10$^7$ |
| | pH 9 | 10 | 0.0009 | 99.91 | 1.11 × 10$^6$ |
| | pH 12 | 10 | 2.7728 | 72.27 | 2.61 × 10$^3$ |

Example 5

For comparison with the experimental data of the previous examples, the kinetics for Cu$^{2+}$, Ag$^+$, Cd$^{2+}$, Pb$^{2+}$, and Hg$^{2+}$ adsorption by LDH-[Sn$_2$S$_6$] were calculated to determine adsorption rates and understand the adsorption mechanism until it reaches equilibrium. In general, the adsorption rate is determined by two different rate equations, known as pseudo-first-order and pseudo-second-order mechanisms. These mechanisms were used to analyze the adsorption phenomena of the LDH-[Sn$_2$S$_6$]. The comparison was then drawn between the experimental and calculated data. The two kinetic rate equations used are as follows:

Pseudo-First-Order:

$$\ln(q_e - q_t) = \ln q_e - k_1 t$$

Pseudo-Second-Order:

$$\frac{t}{q_t} = \frac{1}{k_2 q_e^2} + \frac{t}{q_e}$$

Where, $q_e$ (mg/g) is the amount of adsorbed element per unit mass of adsorbent at equilibrium and $q_t$ (mg/g) is the adsorbed amount at time t, while $k_1$ (min$^{-1}$) and $k_2$ (g/mg min$^{-1}$) are rate constants of pseudo-first-order and pseudo-second-order adsorption interactions, respectively. The $k_1$ value was obtained by plotting $\ln(q_e - q_t)$ against t and $k_2$ by plotting $t/q_t$ against t (FIG. 6D).

Table 4 below details the kinetics data of Cu$^{2+}$, Ag$^+$, Cd$^{2+}$, Pb$^{2+}$, and Hg$^{2+}$ adsorption using LDH-[Sn$_2$S$_6$] where the solution had a volume of about 10 mL, the mass of the solid sample for the experiment was about 0.010 grams such that the V/m ration of the sample was about 1000 mL/g, and the pH was about 7.

As shown in FIGS. 6A-6D and in Table 4, within about 5 minutes, the LDH-[Sn$_2$S$_6$] sorbent material achieved about 99.9% removal of Cu$^{2+}$, Ag$^+$, Cd$^{2+}$, Pb$^{2+}$, and Hg$^{2+}$ with K$_d$ values of over 10$^5$ mL/g for each cation. The removal capacity and K$_d$ reached about 100% and >10$^6$ mL/g, respectively, for all five cations within about 1 hour. Overall, these experiments revealed that the adsorption for all five cations reaches equilibrium in only about 5 minutes. A similar trend in the adsorption kinetics was observed for Hg$^{2+}$ by LDH-MoS$_4$, and for Hg$^{2+}$, Ag$^+$, and Pb$^{2+}$ by polypyrrole-MoS$_4$.

Figure 6A:
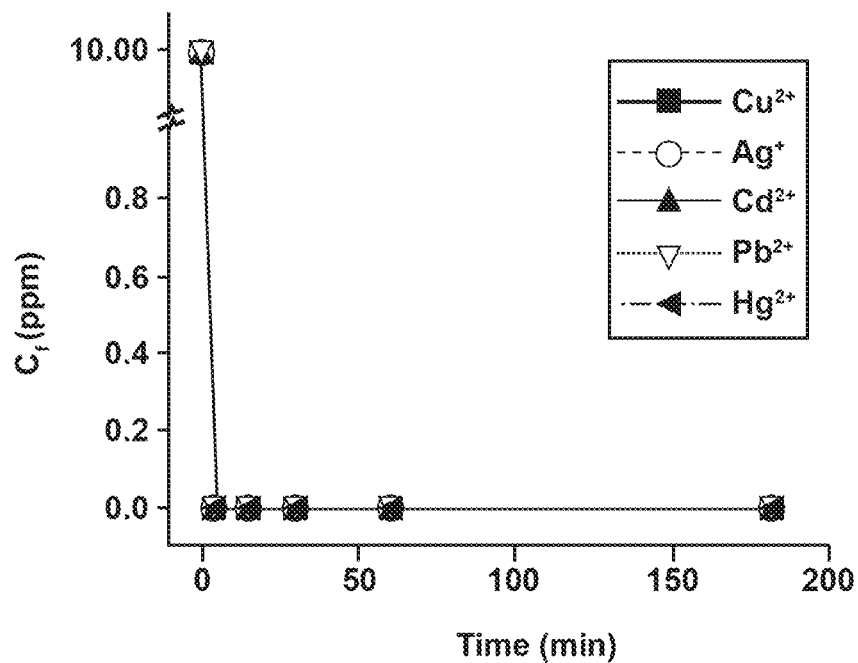
FIG. 6A shows a graphical representation of a kinetic curve for $Cu^{2+}$, $Ag^+$, $Cd^{2+}$, $Pb^{2+}$, and $Hg^{2+}$ depicting ion concentration change with contact time.
Figure 6B:
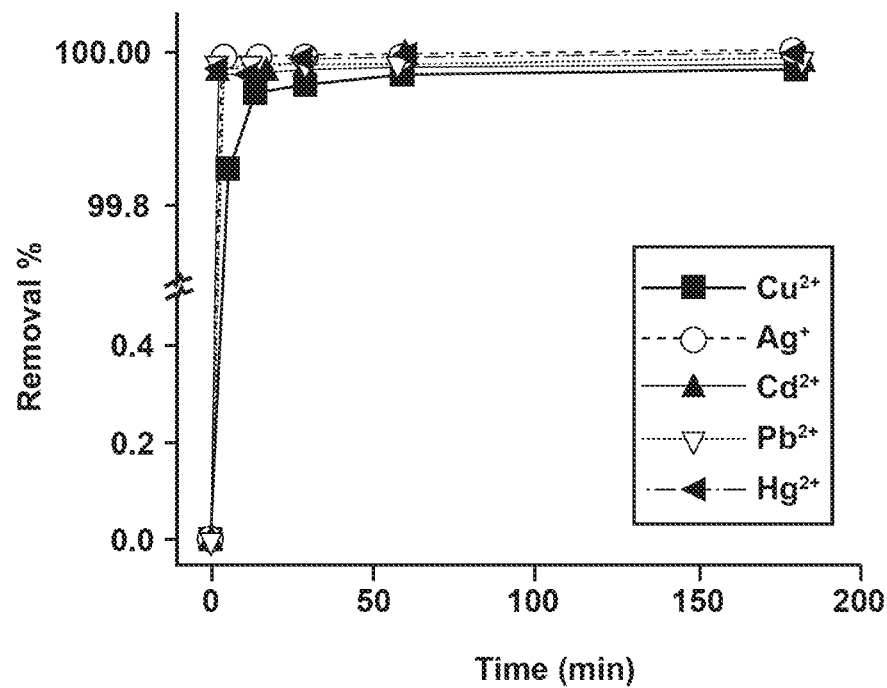
FIG. 6B shows a graphical representation of a kinetic curve for $Cu^{2+}$, $Ag^+$, $Cd^{2+}$, $Pb^{2+}$, and $Hg^{2+}$ depicting removal % as a function of contact time.
Figure 6C:
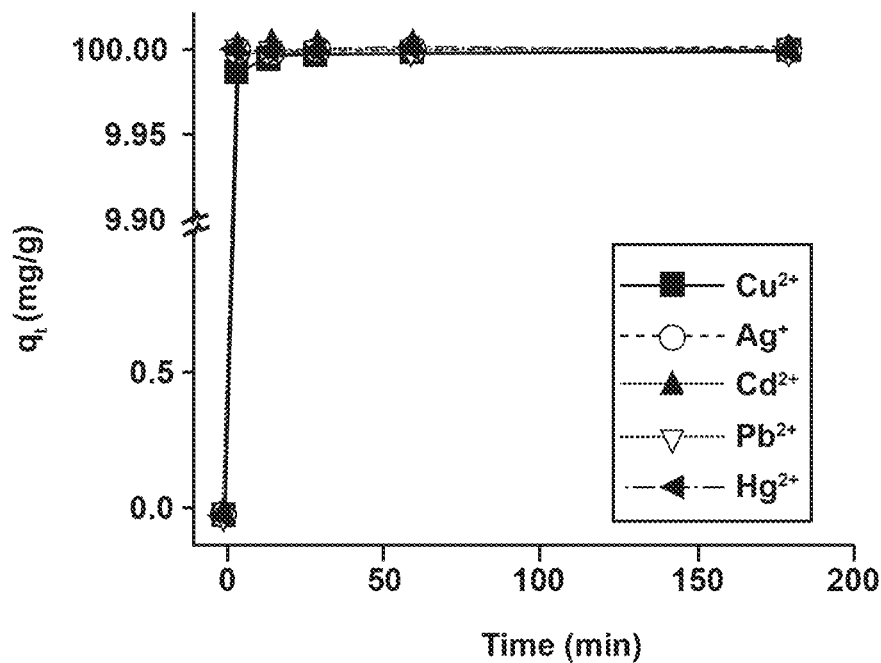
FIG. 6C shows a graphical representation of a kinetic curve for $Cu^{2+}$, $Ag^+$, $Cd^{2+}$, $Pb^{2+}$, and $Hg^{2+}$ depicting sorption capacity ($q_t$) with contact time.
Figure 6D:
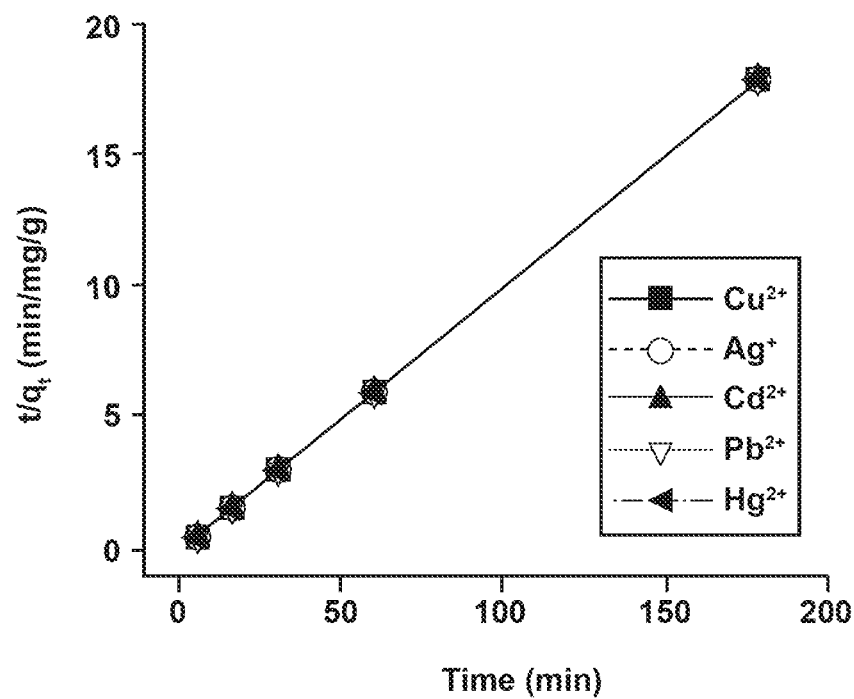
FIG. 6D shows a graphical representation of a kinetic curve for $Cu^{2+}$, $Ag^+$, $Cd^{2+}$, $Pb^{2+}$, and $Hg^{2+}$ depicting pseudo-second-order kinetic plots.

A plot of t/q$_t$ against t, as shown in FIG. 6D, illustrated a linear relationship for all five cations. The kinetic parameters for Cu$^{2+}$, Ag$^+$, Cd$^{2+}$, Pb$^{2+}$, and Hg$^{2+}$ are summarized in Table 5 below. The calculated sorption capacities (q$_{e,cal}$) derived from pseudo-second-order model are close to corresponding experimental values (q$_{e,exp}$). The goodness of fit parameter (R$^2$), is close to unity for all the cations. This indicates that adsorption for these ions onto LDH-[Sn$_2$S$_6$] follows pseudo-second-order kinetics, suggesting that the adsorption follows chemisorption pathways.

TABLE 4

| Ions | Time (min) | Pre-adsorption concentration (C$_i$) (ppm) | Post-adsorption concentration (C$_f$) (ppm) | M$^{n+}$ removal % | K$_d$ (mL/g) | q$_t$ (mg/g) |
|---|---|---|---|---|---|---|
| Cu$^{2+}$ | 5 | 10 | 0.01488 | 99.85 | 6.71 × 10$^5$ | 9.985 |
| | 15 | 10 | 0.00469 | 99.95 | 2.13 × 10$^6$ | 9.995 |
| | 30 | 10 | 0.00398 | 99.96 | 2.51 × 10$^6$ | 9.996 |
| | 60 | 10 | 0.00314 | 99.97 | 3.18 × 10$^6$ | 9.997 |
| | 180 | 10 | 0.00218 | 99.98 | 4.59 × 10$^6$ | 9.998 |
| Ag$^+$ | 5 | 10 | 0.00120 | 99.99 | 8.33 × 10$^6$ | 9.999 |
| | 15 | 10 | 0.00087 | 99.99 | 1.15 × 10$^7$ | 9.999 |
| | 30 | 10 | 0.00074 | 99.99 | 1.35 × 10$^7$ | 9.999 |
| | 60 | 10 | 0.00059 | 99.99 | 1.69 × 10$^7$ | 9.999 |
| | 180 | 10 | 0.00042 | ~100 | 2.38 × 10$^7$ | 10.000 |
| Cd$^{2+}$ | 5 | 10 | 0.00157 | 99.98 | 6.37 × 10$^6$ | 9.998 |
| | 15 | 10 | 0.00197 | 99.98 | 5.08 × 10$^6$ | 9.998 |
| | 30 | 10 | 0.00191 | 99.98 | 5.23 × 10$^6$ | 9.998 |
| | 60 | 10 | 0.00105 | 99.99 | 9.52 × 10$^6$ | 9.999 |
| | 180 | 10 | 0.00096 | 99.99 | 1.04 × 10$^7$ | 9.999 |
| Pb$^{2+}$ | 5 | 10 | 0.00183 | 99.98 | 5.46 × 10$^6$ | 9.998 |
| | 15 | 10 | 0.00163 | 99.98 | 6.13 × 10$^6$ | 9.998 |
| | 30 | 10 | 0.00148 | 99.99 | 6.76 × 10$^6$ | 9.999 |
| | 60 | 10 | 0.00126 | 99.99 | 7.94 × 10$^6$ | 9.999 |
| | 180 | 10 | 0.00068 | 99.99 | 1.47 × 10$^7$ | 9.999 |
| Hg$^{2+}$ | 5 | 10 | 0.00232 | 99.98 | 4.31 × 10$^6$ | 9.998 |
| | 15 | 10 | 0.00313 | 99.97 | 3.19 × 10$^6$ | 9.997 |
| | 30 | 10 | 0.00055 | 99.99 | 1.82 × 10$^7$ | 9.999 |
| | 60 | 10 | 0.00072 | 99.99 | 1.39 × 10$^7$ | 9.999 |
| | 180 | 10 | 0.00053 | 99.99 | 1.89 × 10$^7$ | 9.999 |

TABLE 5

| Ions | q$_{e, exp}$ | k$_2$ | q$_{e, cal}$ | R$^2$ |
|---|---|---|---|---|
| Cu$^{2+}$ | 9.998 | 16.32 | 9.9991 | 1 |
| Ag$^+$ | 10.0 | 38.46 | 10.0 | 1 |
| Cd$^{2+}$ | 9.999 | 699.37 | 9.999 | 1 |
| Pb$^{2+}$ | 9.999 | 38.03 | 9.999 | 1 |
| Hg$^{2+}$ | 9.999 | 2.87 | 9.999 | 1 |

Example 6

To determine the maximum sorption capacity of LDH-[Sn$_2$S$_6$] for Cu$^{2+}$, Ag$^+$, Cd$^{2+}$, Pb$^{2+}$, and Hg$^{2+}$, an adsorption equilibrium study was carried out over a concentration ranging from about 10 ppm to about 1500 ppm. Results of the study of Example 6 are detailed below in Table 6. As shown in FIGS. 7A-7E, the results of this Example 6 reveal increasing adsorption with increasing concentrations of $Cu^{2+}$, $Ag^+$, $Cd^{2+}$, $Pb^{2+}$, and $Hg^{2+}$ before reaching equilibrium.

FIGS. 7A-7E illustrate sorption isotherms of $Cu^{2+}$, $Ag^+$, $Cd^{2+}$, $Pb^{2+}$, and $Hg^{2+}$, respectively, at a pH of about 7. The isotherms were derived from the experimental data fitted with Langmuir model at equilibrium concentrations (Ce) and adsorption capacity ($q_m$). This model predicts that adsorbate moieties undergo monolayer type coverage on the surface of the adsorbent. It assumes that once an adsorption site is occupied, no further adsorption can occur at the same site. The Langmuir isotherm model is shown as equation:

$$q = q_m \frac{bCe}{1+bCe}$$

Where Ce (mg/L) is the concentration at equilibrium, q (mg/g) is the equilibrium sorption capacity of the adsorbed $M^{n+}$ ($Cu^{2+}$, $Ag^+$, $Cd^{2+}$, $Pb^{2+}$, and $Hg^{2+}$), $q_m$ (mg/g) is the theoretical maximum sorption capacity, b (L·mg$^{-1}$) is the Langmuir constant, and Ce (mg/L) is the equilibrium concentration. The correlation coefficient, $R^2$ was ≥0.98 for $Cu^{2+}$, 0.93 for $Ag^+$, 0.98 for $Hg^{2+}$, 0.95 for $Cd^{2+}$, and 0.98 for $Pb^{2+}$ suggesting a good fit with the Langmuir model, as shown in FIGS. 7A-7E.

TABLE 6

| Ions | Pre-adsorption concentration ($C_i$) (ppm) | Post-adsorption concentration ($C_f$) (ppm) | Removal (%) | $K_d$ (mL/g) | $q_m$ (mg/g) |
|---|---|---|---|---|---|
| $Cu^{2+}$ | 10 | 0.003 | 99.97 | $3.33 \times 10^6$ | $1.00 \times 10^1$ |
| | 50 | 14.91 | 70.16 | $2.35 \times 10^3$ | $3.51 \times 10^1$ |
| | 100 | 49.29 | 50.71 | $1.03 \times 10^3$ | $5.07 \times 10^1$ |
| | 300 | 200.94 | 33.02 | $4.93 \times 10^2$ | $9.91 \times 10^1$ |
| | 500 | 300.32 | 35.94 | $6.65 \times 10^2$ | $1.80 \times 10^2$ |
| | 700 | 460.54 | 34.21 | $5.20 \times 10^2$ | $2.39 \times 10^2$ |
| | 1000 | 722.08 | 27.79 | $3.85 \times 10^2$ | $2.78 \times 10^2$ |
| | 1500 | 1122.32 | 25.18 | $3.37 \times 10^2$ | $3.78 \times 10^2$ |
| $Ag^+$ | 10 | 0.001 | 99.99 | $1.00 \times 10^7$ | $1.00 \times 10^1$ |
| | 50 | 0.029 | 99.94 | $1.72 \times 10^6$ | $5.00 \times 10^1$ |
| | 100 | 0.063 | 99.94 | $1.59 \times 10^6$ | $9.99 \times 10^1$ |
| | 300 | 0.179 | 99.94 | $1.67 \times 10^6$ | $3.00 \times 10^2$ |
| | 500 | 30.708 | 93.86 | $1.53 \times 10^4$ | $4.69 \times 10^2$ |
| | 700 | 140.356 | 79.95 | $3.99 \times 10^3$ | $6.69 \times 10^2$ |
| | 1000 | 309.948 | 69.01 | $2.23 \times 10^3$ | $6.90 \times 10^2$ |
| | 1500 | 521.922 | 65.21 | $1.87 \times 10^3$ | $9.78 \times 10^2$ |
| $Cd^{+2}$ | 10 | 0.001 | 99.99 | $1.00 \times 10^7$ | $1.00 \times 10^1$ |
| | 50 | 0.238 | 99.52 | $2.09 \times 10^5$ | $4.98 \times 10^1$ |
| | 300 | 165.637 | 44.79 | $8.11 \times 10^2$ | $1.34 \times 10^2$ |
| | 500 | 309.518 | 38.10 | $6.15 \times 10^2$ | $1.90 \times 10^2$ |
| | 700 | 453.480 | 35.22 | $5.44 \times 10^2$ | $2.47 \times 10^2$ |
| | 1000 | 688.292 | 31.17 | $4.53 \times 10^2$ | $3.12 \times 10^2$ |
| | 1500 | 1168.092 | 22.13 | $2.84 \times 10^2$ | $3.32 \times 10^2$ |
| $Pb^{+2}$ | 10 | 0.002 | 99.98 | $5.00 \times 10^6$ | $1.00 \times 10^1$ |
| | 50 | 0.009 | 99.98 | $5.88 \times 10^6$ | $5.00 \times 10^1$ |
| | 300 | 188.3 | 37.23 | $5.93 \times 10^2$ | $1.12 \times 10^2$ |
| | 700 | 318.064 | 54.56 | $1.20 \times 10^3$ | $3.82 \times 10^2$ |
| | 1000 | 504.156 | 49.58 | $9.84 \times 10^2$ | $4.96 \times 10^2$ |
| | 1500 | 921.496 | 38.57 | $6.28 \times 10^2$ | $5.79 \times 10^2$ |
| $Hg^{+2}$ | 10 | 0.001 | 99.99 | $9.90 \times 10^6$ | $1.00 \times 10^1$ |
| | 50 | 0.012 | 99.98 | $4.17 \times 10^6$ | $5.00 \times 10^1$ |
| | 100 | 0.038 | 99.96 | $2.63 \times 10^5$ | $1.00 \times 10^2$ |
| | 300 | 0.210 | 99.93 | $1.43 \times 10^5$ | $3.00 \times 10^2$ |
| | 500 | 0.396 | 99.92 | $1.26 \times 10^5$ | $5.00 \times 10^2$ |
| | 700 | 90.140 | 87.12 | $6.77 \times 10^3$ | $6.10 \times 10^2$ |

TABLE 6-continued

| Ions | Pre-adsorption concentration ($C_i$) (ppm) | Post-adsorption concentration ($C_f$) (ppm) | Removal (%) | $K_d$ (mL/g) | $q_m$ (mg/g) |
|---|---|---|---|---|---|
| | 1000 | 357.432 | 64.26 | $1.80 \times 10^2$ | $6.43 \times 10^2$ |
| | 1500 | 833.538 | 44.43 | $8.00 \times 10^2$ | $6.66 \times 10^2$ |

Figure 7A:
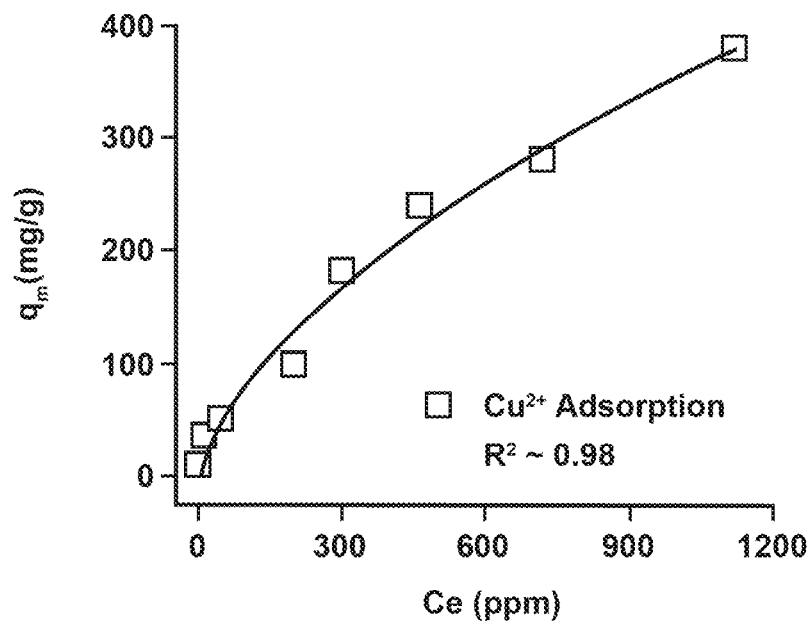
FIG. 7A shows a graphical representation of a sorption isotherm of $Cu^{2+}$ at a pH of about 7 derived from experimental data fitted with a Langmuir model at equilibrium concentrations (Ce) and adsorption capacity ($q_m$).
Figure 7B:
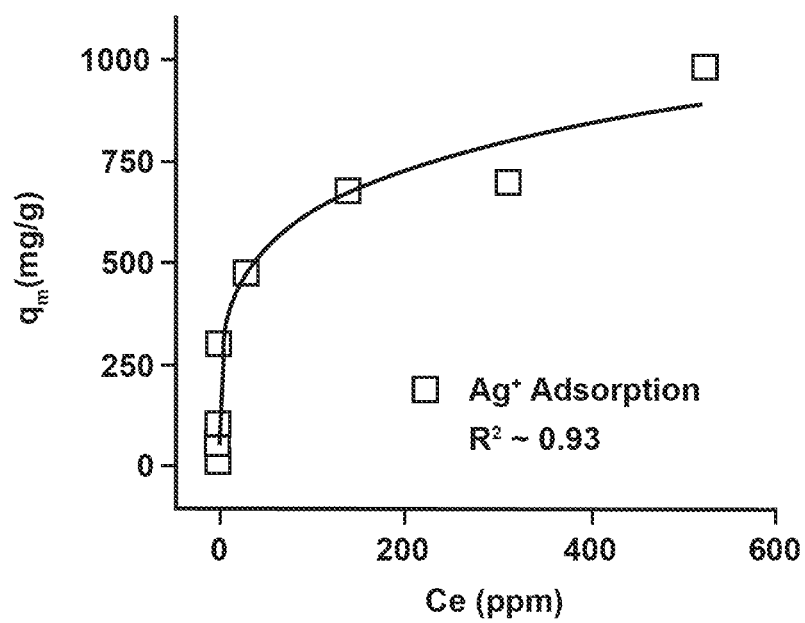
FIG. 7B shows a graphical representation of a sorption isotherm of $Ag^+$ at a pH of about 7 derived from experimental data fitted with a Langmuir model at equilibrium concentrations (Ce) and adsorption capacity ($q_m$).
Figure 7C:
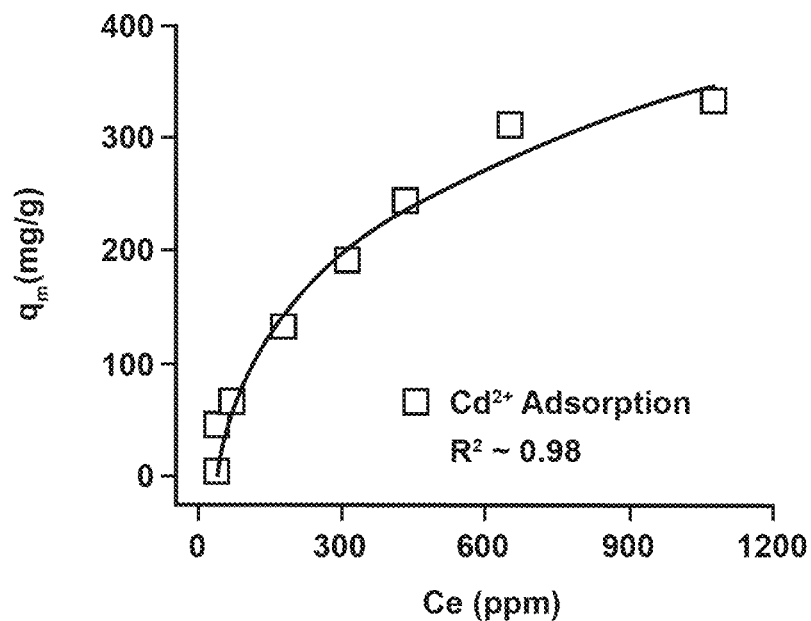
FIG. 7C shows a graphical representation of sorption isotherms of $Cd^{2+}$ at pH-7, derived from the experimental data fitted with Langmuir model at equilibrium concentrations (Ce) and adsorption capacity ($q_m$).
Figure 7D:
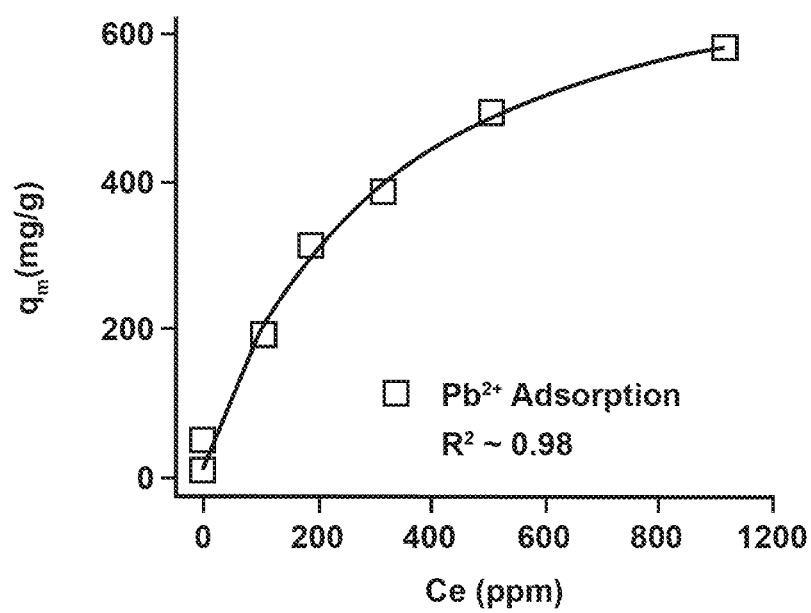
FIG. 7D shows a graphical representation of sorption isotherms of $Pb^{2+}$ at pH-7, derived from the experimental data fitted with Langmuir model at equilibrium concentrations (Ce) and adsorption capacity ($q_m$).
Figure 7E:
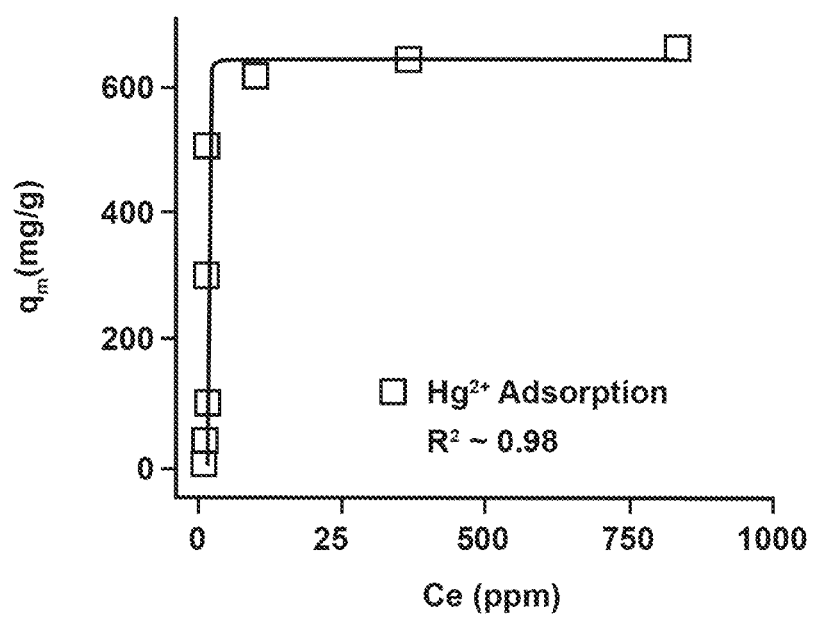
FIG. 7E shows a graphical representation of sorption isotherms of $Hg^{2+}$ at pH-7, derived from the experimental data fitted with Langmuir model at equilibrium concentrations (Ce) and adsorption capacity ($q_m$).
Figure 8A:
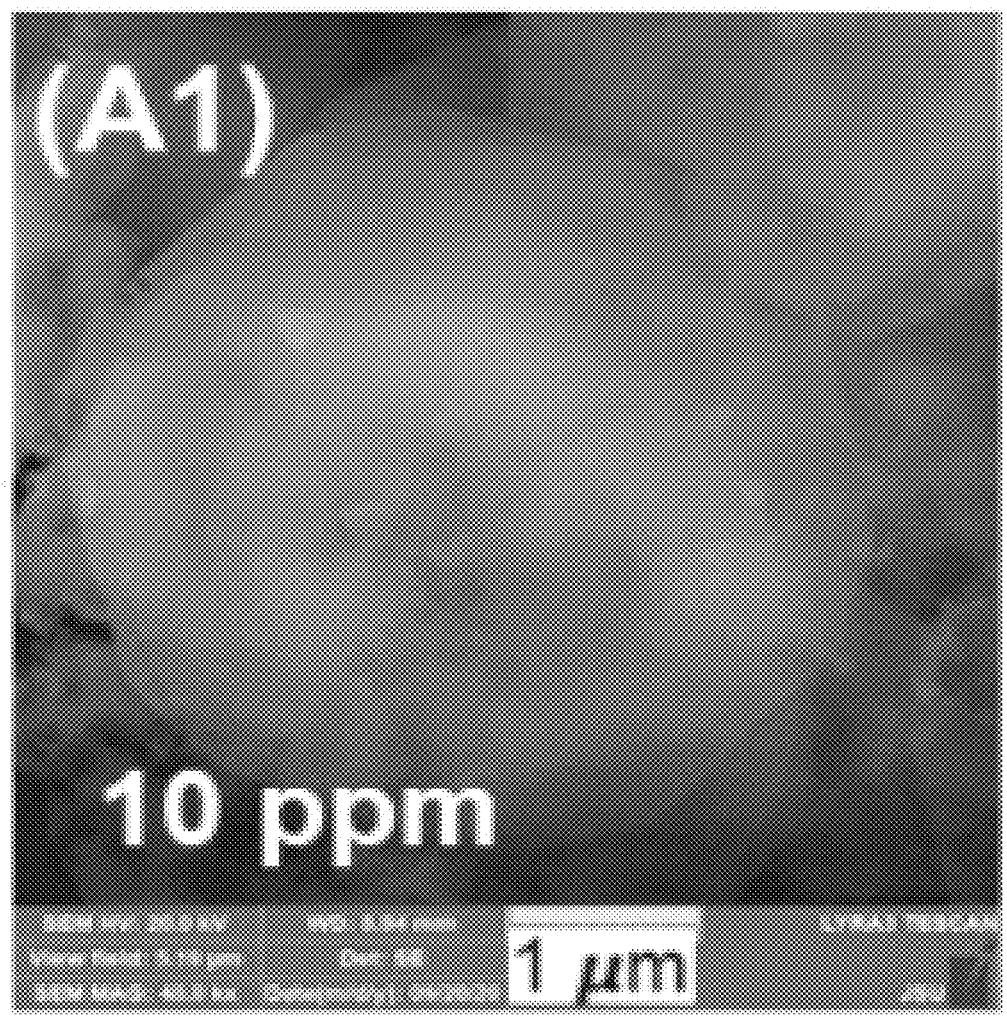
FIG. 8A shows an SEM image of LDH-[$Sn_2S_6$], after the adsorption of 10 ppm of $Cu^{2+}$.
Figure 8B:
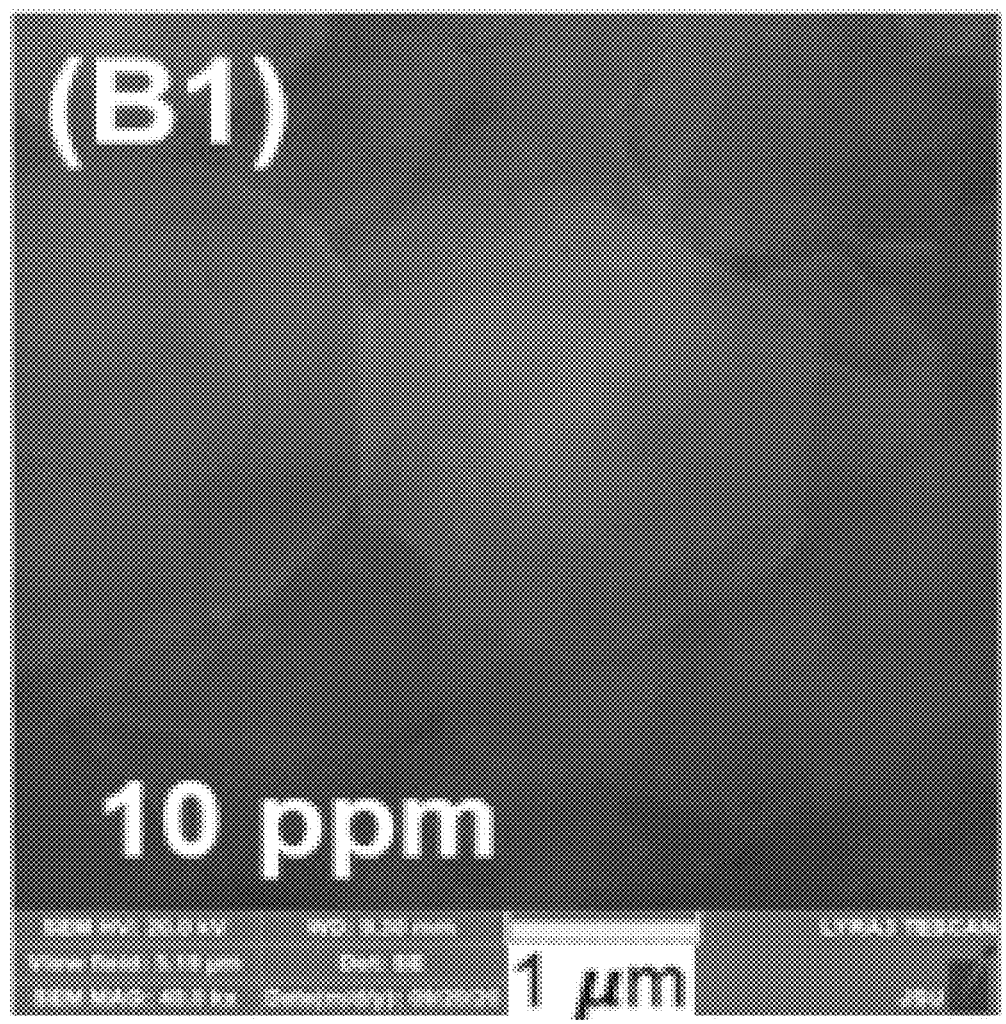
FIG. 8B shows an SEM image of LDH-[$Sn_2S_6$], after the adsorption of 10 ppm of $Ag^+$.
Figure 8C:
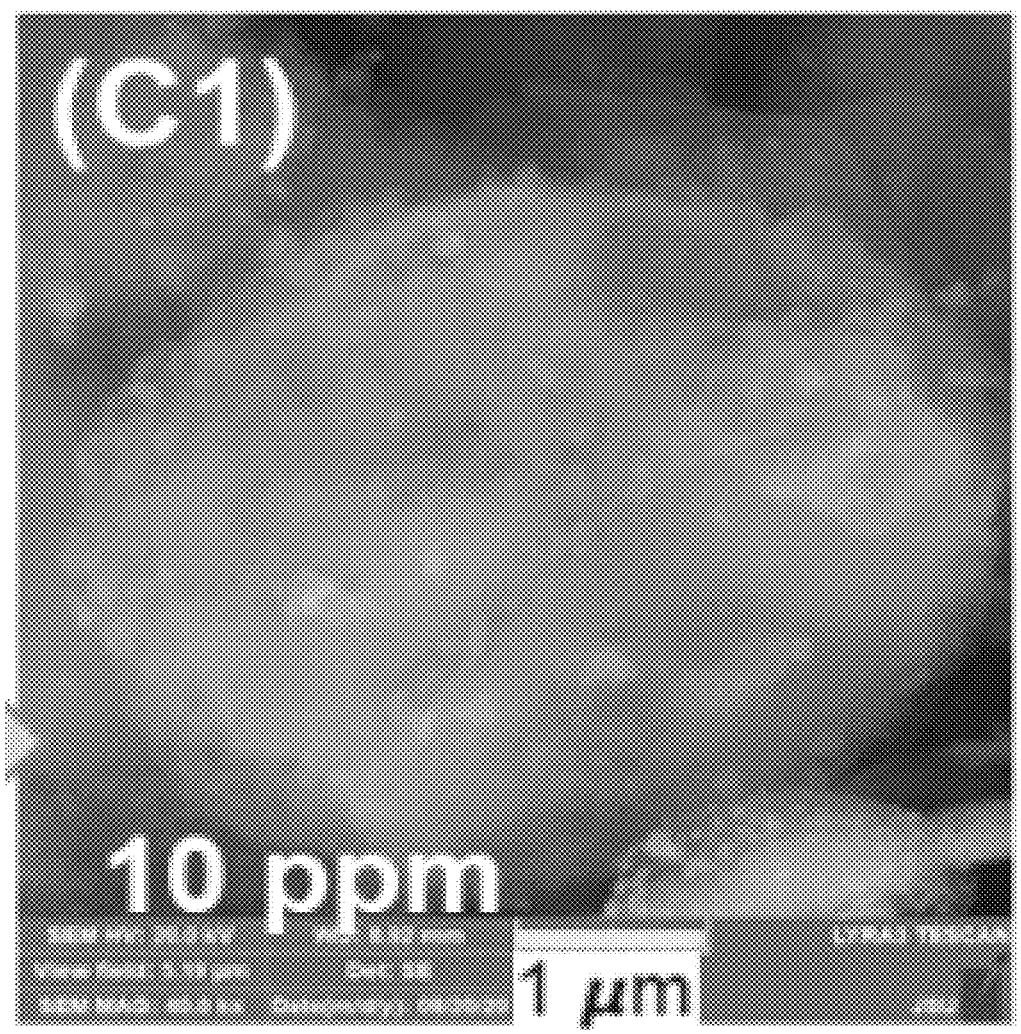
FIG. 8C shows an SEM image of LDH-[$Sn_2S_6$], after the adsorption of 10 ppm of $Cd^{2+}$.
Figure 8D:
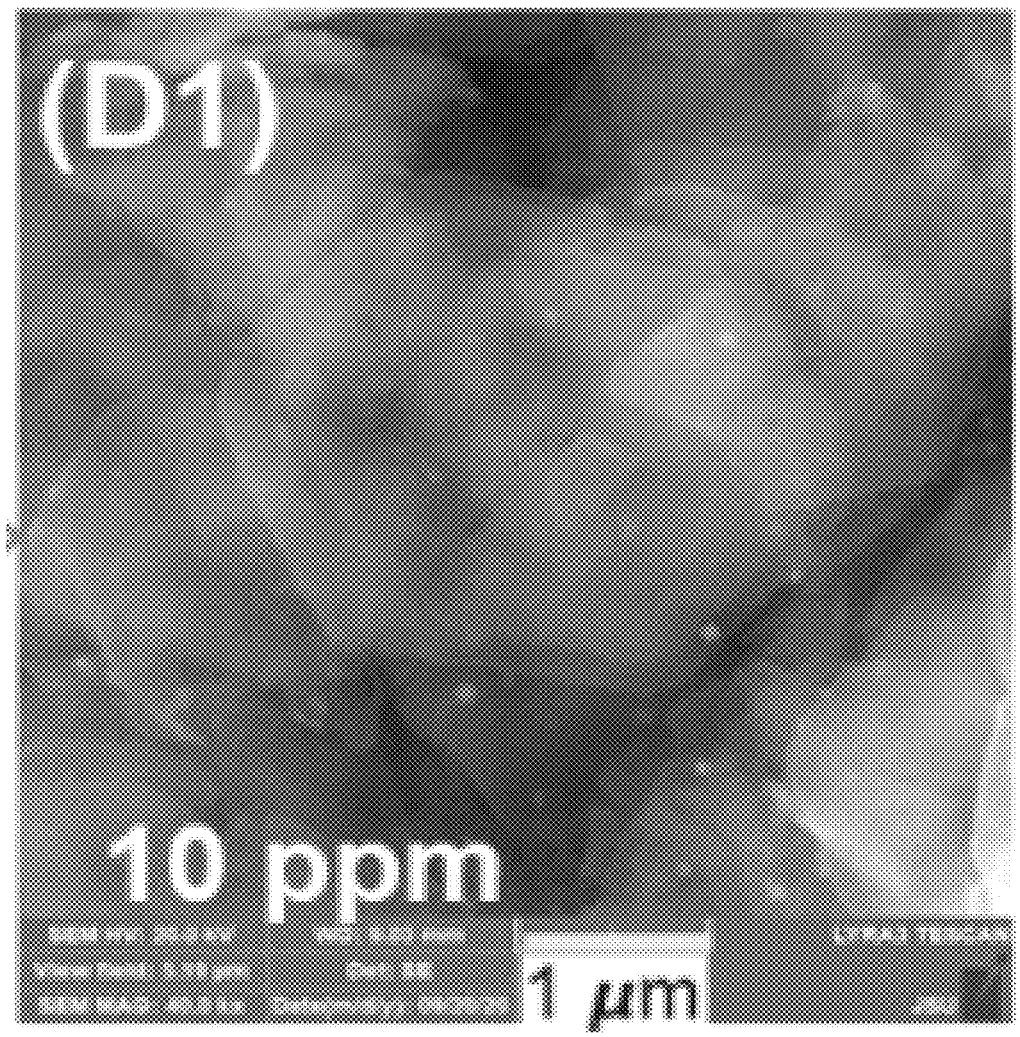
FIG. 8D shows an SEM image of LDH-[$Sn_2S_6$], after the adsorption of 10 ppm of $Pb^{2+}$.
Figure 8E:
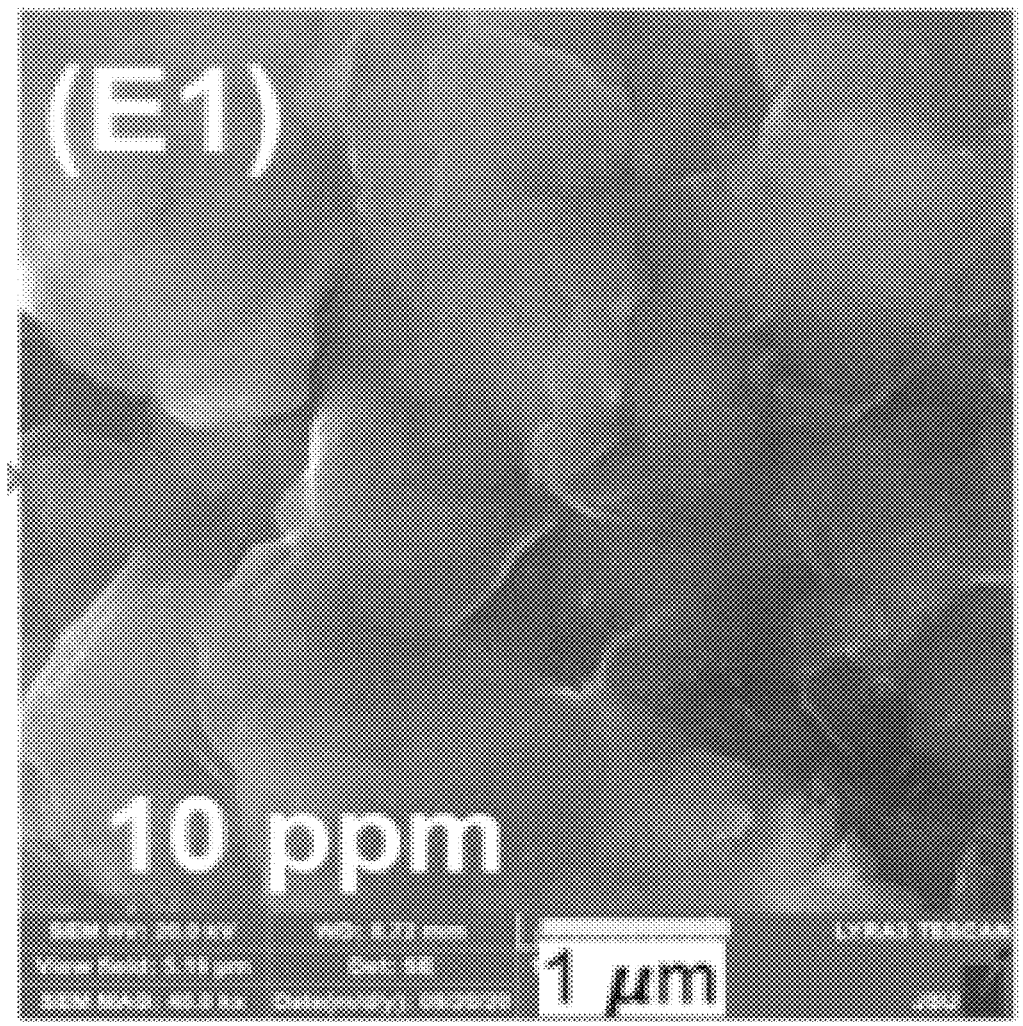
FIG. 8E shows an SEM image of LDH-[$Sn_2S_6$], after the adsorption of 10 ppm of $Hg^{2+}$.
Figure 9A:
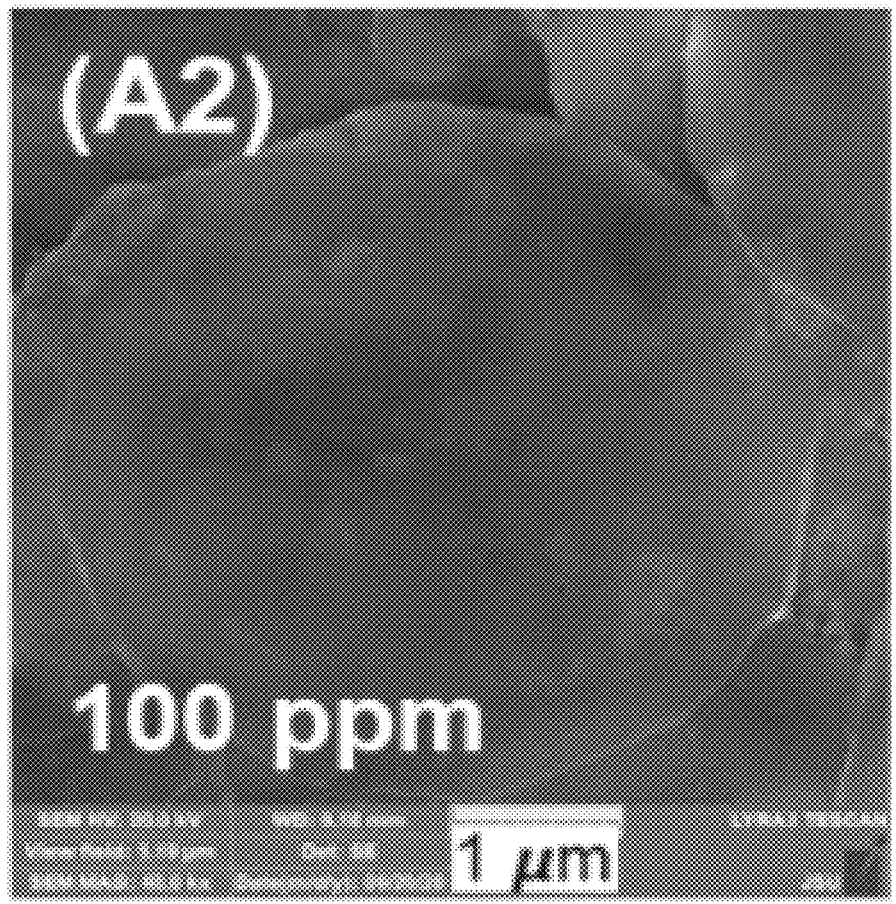
FIG. 9A shows an SEM image of LDH-[$Sn_2S_6$], after the adsorption of 100 ppm of $Cu^{2+}$.
Figure 9B:
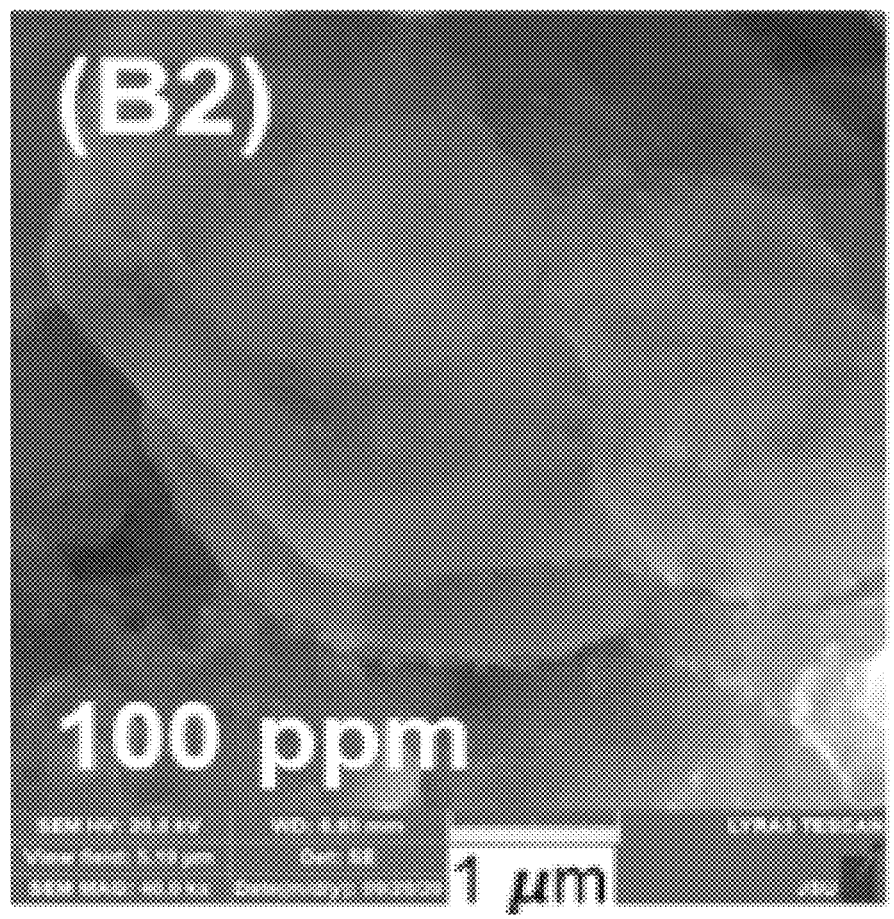
FIG. 9B shows an SEM image of LDH-[$Sn_2S_6$], after the adsorption of 100 ppm of $Ag^+$.
Figure 9C:
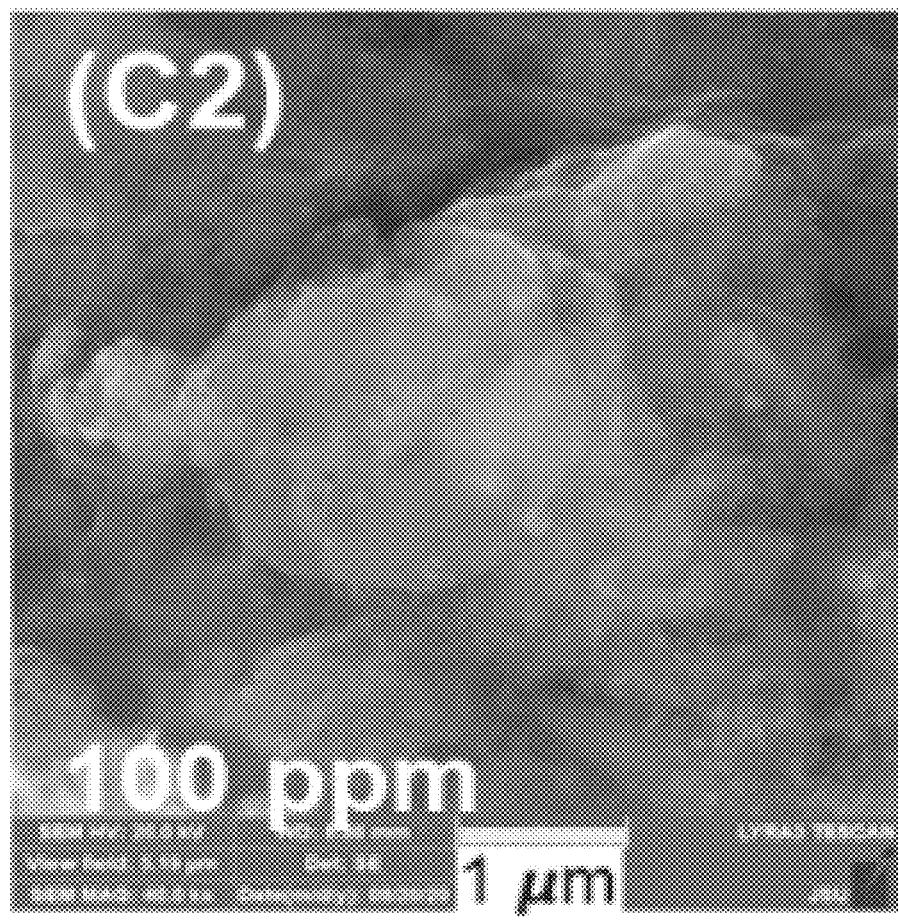
FIG. 9C shows an SEM image of LDH-[$Sn_2S_6$], after the adsorption of 100 ppm of $Cd^{2+}$.
Figure 9D:
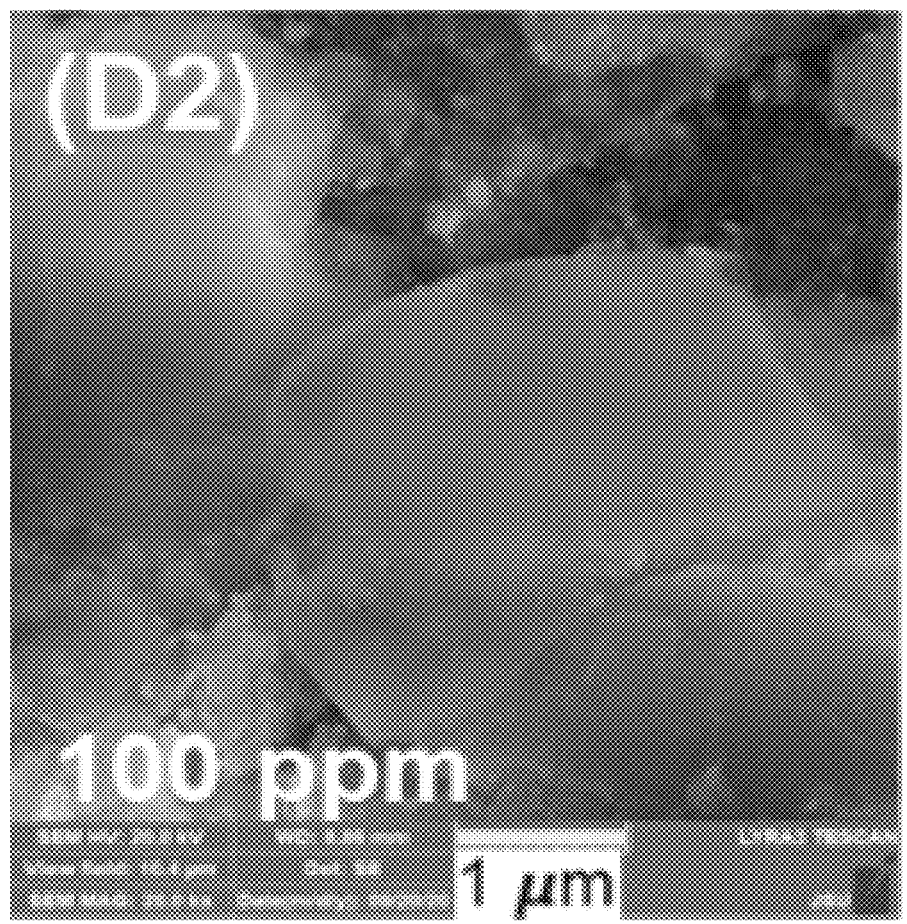
FIG. 9D shows an SEM image of LDH-[$Sn_2S_6$], after the adsorption of 100 ppm of $Pb^{2+}$.
Figure 9E:
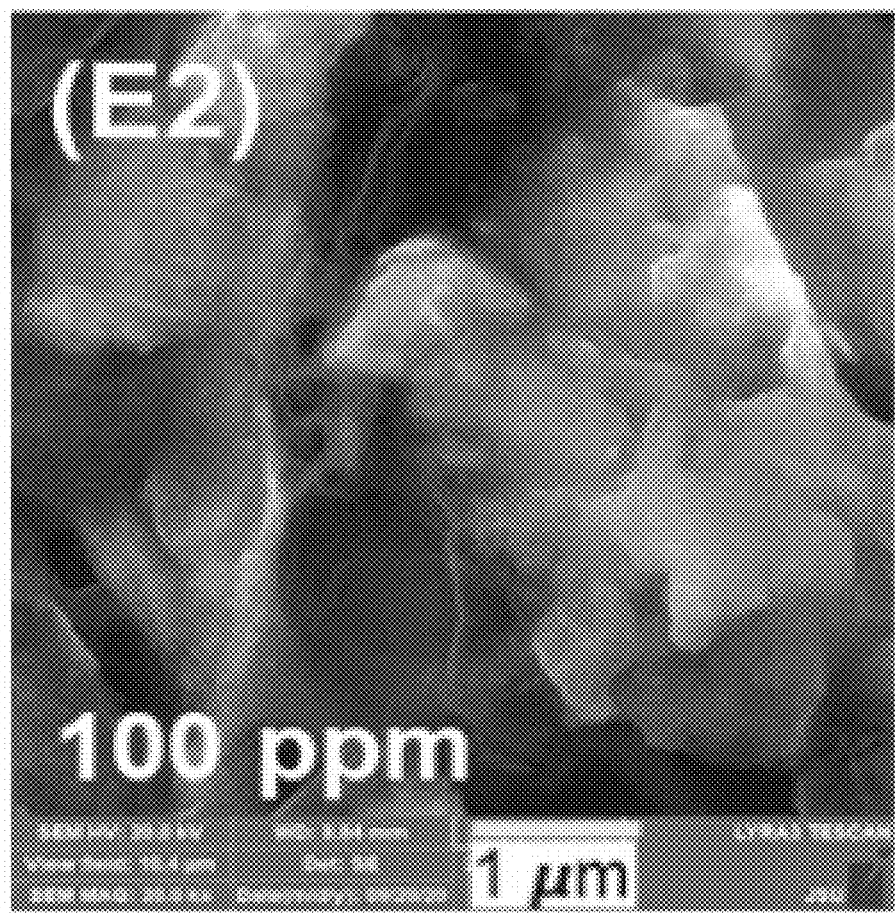
FIG. 9E shows an SEM image of LDH-[$Sn_2S_6$], after the adsorption of 100 ppm of $Hg^{2+}$.
Figure 10A:
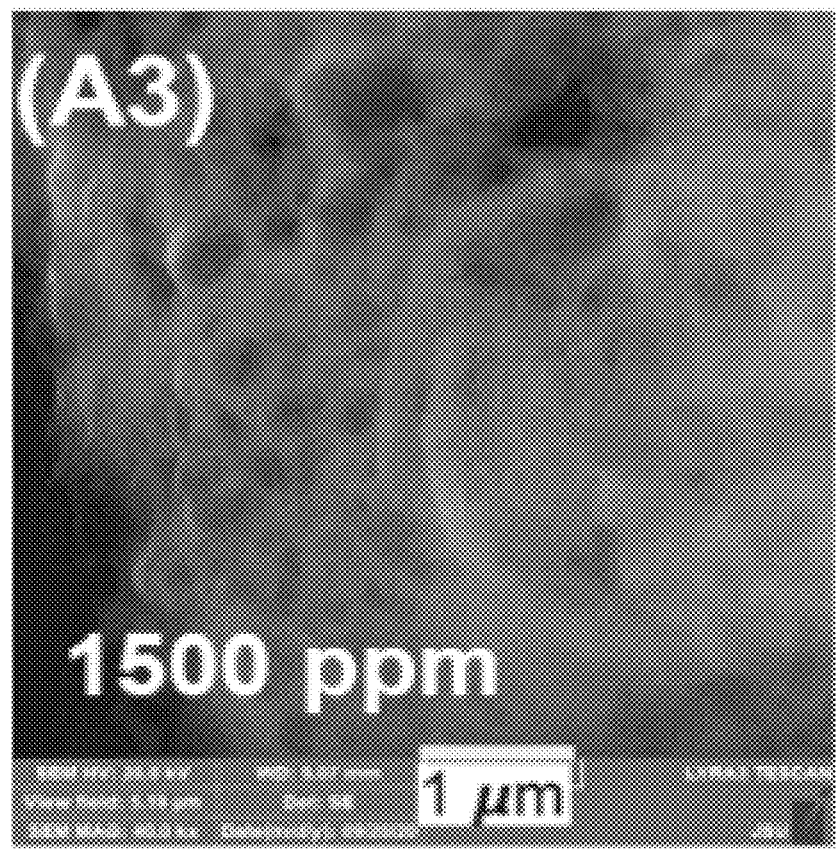
FIG. 10A shows an SEM image of LDH-[$Sn_2S_6$], after the adsorption of 1500 ppm of $Cu^{2+}$.
Figure 10B:
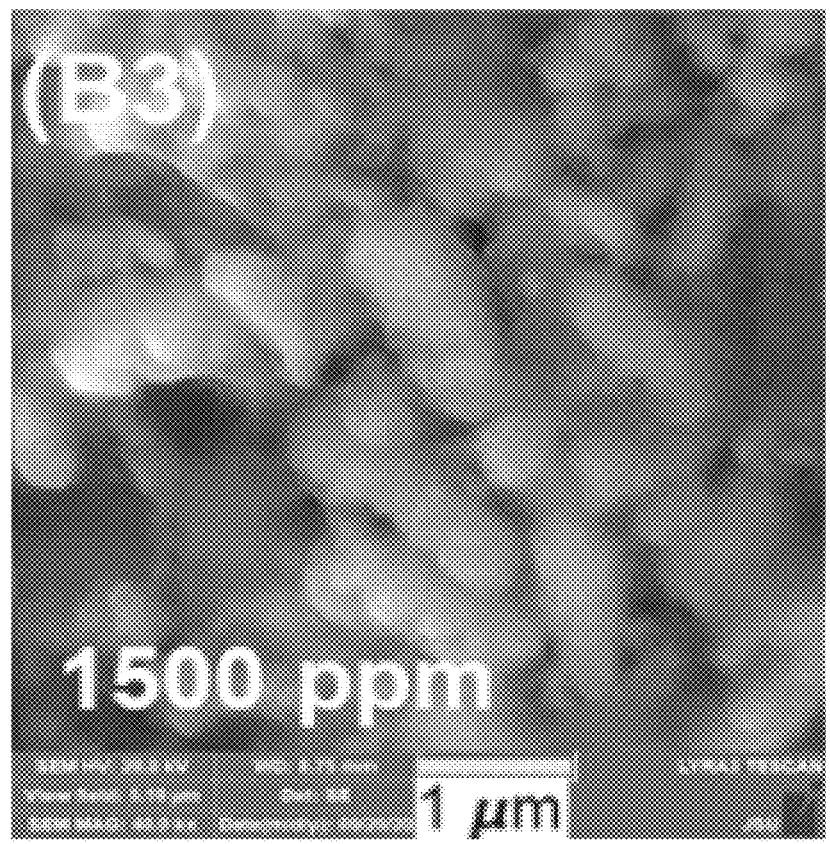
FIG. 10B shows an SEM image of LDH-[$Sn_2S_6$], after the adsorption of 1500 ppm of $Ag^+$.
Figure 10C:
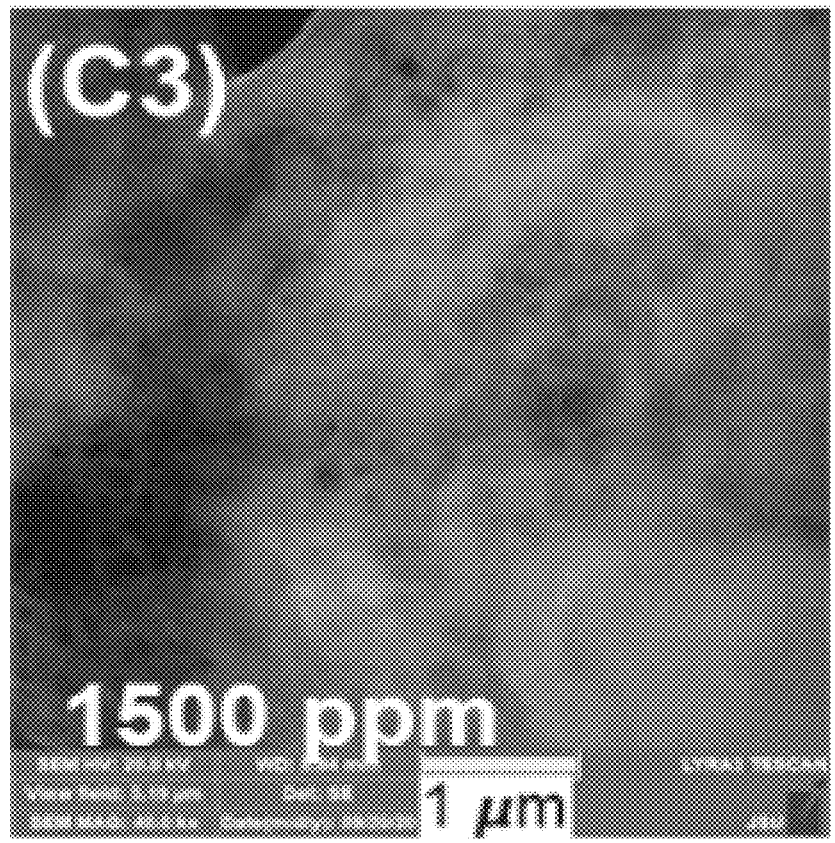
FIG. 10C shows an SEM image of LDH-[$Sn_2S_6$], after the adsorption of 1500 ppm of $Cd^{2+}$.
Figure 10D:
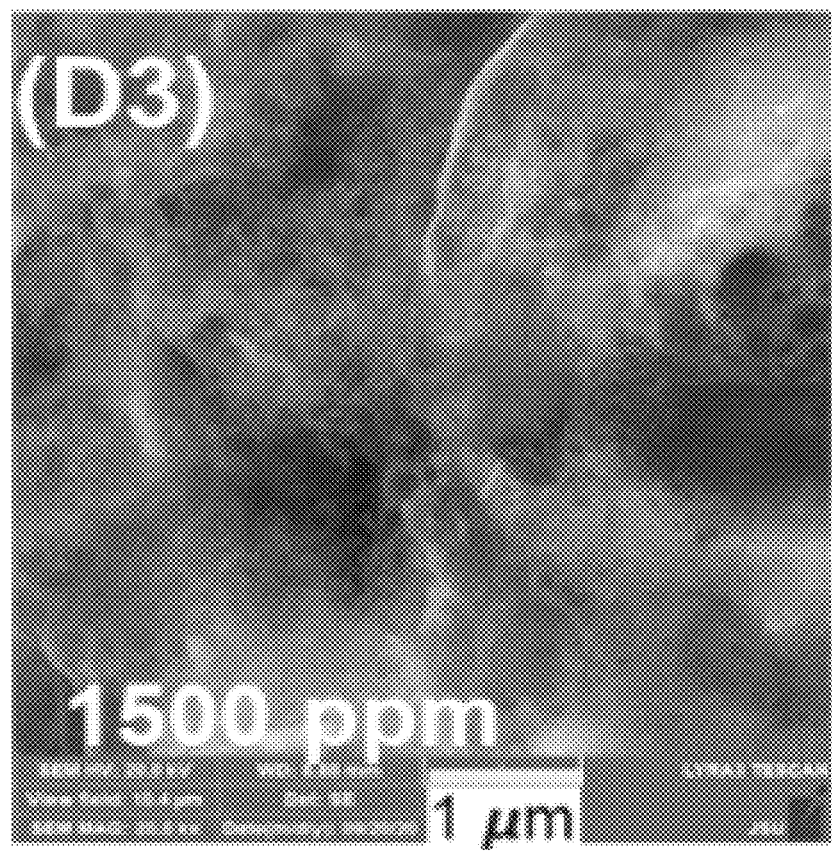
FIG. 10D shows an SEM image of LDH-[$Sn_2S_6$], after the adsorption of 1500 ppm of $Pb^{2+}$.
Figure 10E:
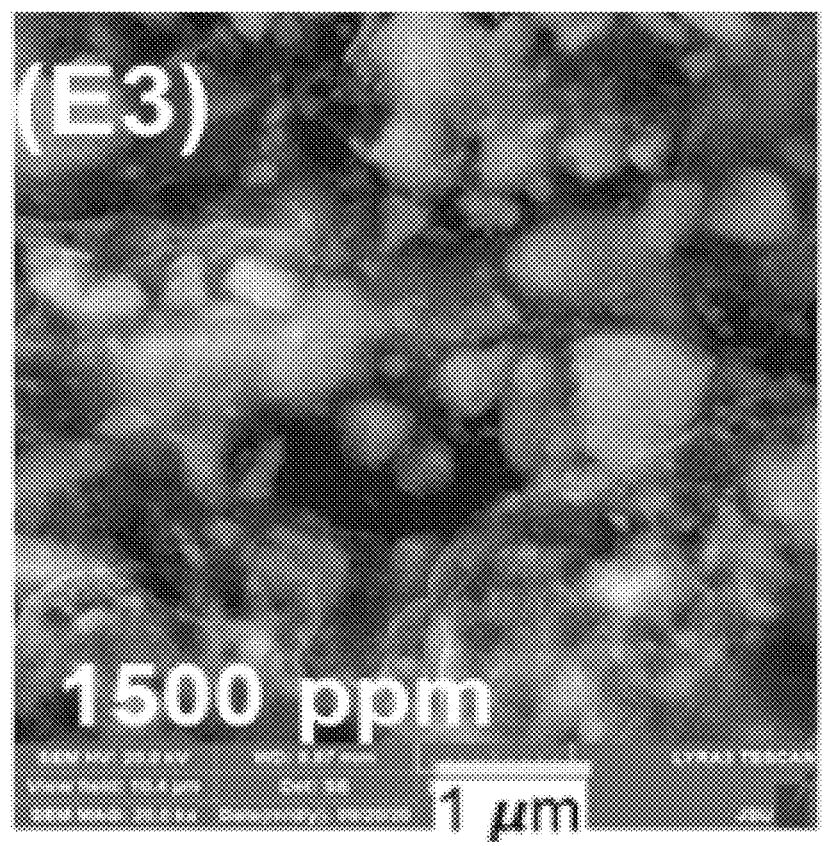
FIG. 10E shows an SEM image of LDH-[$Sn_2S_6$], after the adsorption of 1500 ppm of $Hg^{2+}$.

As detailed in Table 6 and shown in FIG. 7A, LDH-[$Sn_2S_6$] achieved a maximum adsorption capacity of about 378 mg/g for $Cu^{2+}$. Additionally, as shown in FIG. 7B, LDH-[$Sn_2S_6$] exhibits ultra-high removal of $Ag^+$ over a wide range of initial concentrations (10 to 300 ppm). For the entire concentration range, the sorption of $Ag^+$ remains over 99.9% with $K_d^{Ag}$ values of over $10^5$ mL/g. The maximum adsorption capacity for $Ag^+$ ($q_m^{Ag}$) reached a value of 978 mg/g. Over 99% of $Cd^{2+}$ was removed by LDH-[$Sn_2S_6$] for concentrations up to 50 ppm with $K_d^{Cd}$ values in the range of about $10^4$ to about $10^6$ mL/g. The maximum adsorption capacity obtained was 332 mg/g. A similar removal rate (99.9%) was found for $Pb^{2+}$ for concentrations up to 50 ppm. The maximum capture capacity achieved for $Pb^{2+}$ (579 mg/g) was recorded for a 1500 ppm spiked solution.

As detailed in Table 6, the adsorption capacity of $Hg^{2+}$ for a solution of about 10 ppm to about 1500 ppm was also considered. LDH-[$Sn_2S_6$] was shown to remove ≥99.9% of $Hg^{2+}$ from a 500 ppm solution. At concentrations from 10 to 500 ppm, the $K_d^{Hg}$ values remain in the range of about $10^5$ mL/g to about $10^6$ mL/g. The maximum $Hg^{2+}$ removal capacity exhibited by LDH-[$Sn_2S_6$] was about 666 mg/g, is higher than any known adsorbents.

Table 7 below details the comparative values of the adsorption capacities of known high performing sorbents for each of the heavy metal ions. As seen in Table 7, metal sulfide or polysulfide intercalated LDHs, such as LDH-$MoS_4$ and LDH-$S_x$ (x=2-4) are currently used options for the adsorption of heavy metal cations. Compared to other metal sulfide or polysulfide intercalated LDHs, LDH-$Sn_2S_6$ exhibits the largest interlayer spacing that could facilitate the facile diffusion of cations into the interlayer spaces to result in the increased adsorption shown in this Example 6. With the high absorption capacities discussed above, LDH-[$Sn_2S_6$] outperforms the high performing adsorbents currently known. For example, the adsorption capacity for $Cu^{2+}$ exhibited by LDH-[$Sn_2S_6$] is much higher than highly performing sorbents, namely $MoS_4$-LDH (181 mg/g), PANI-PS (171 mg/g), KMS-1 (156 mg/g), and SX-LDH (127 mg/g). Additionally, as can be seen in Table 6, the maximum adsorption capacity for $Ag^+$ exhibited by LDH-[$Sn_2S_6$] is exceptionally high when compared to other top materials such as Ni/Fe/Ti—$MoS_4$-LDH (856 mg/g), Mn—$MoS_4$ (564 mg/g), $MoS_4$-LDH (550 mg/g), $MoS_4$-ppy (480 mg/g at pH ~5), and $Mo_3S_{13}$-Ppy (408 mg/g). Regarding $Cd^{2+}$, LDH-[$Sn_2S_6$] exhibited a maximum adsorption capacity higher than any of the high performing $Cd^{2+}$ adsorbents listed in Table 7 and comparable to KTS-3. The maximum capture capacity achieved for $Pb^{2+}$ exceeds the capacities exhibited by the comparable materials of Table 7. The maximum $Hg^{2+}$ removal capacity exhibited by LDH-[$Sn_2S_6$] was also higher than any of the comparable materials of Table 6. The results of Table 6 and the comparison detailed in Table 7 suggest that LDH-[$Sn_2S_6$] is a unique adsorbent that outperforms for the sorption of a large number of heavy metals cations.

TABLE 7

| Cation | Adsorbents | $q_m$ (mg/g) | Source |
|---|---|---|---|
| $Cu^{2+}$ | LDH-[$Sn_2S_6$] | 378 | — |
| | $MoS_4$-LDH | 181 | Ma et al., *J. Am. Chem. Soc.* 138 (2016) |
| | PEI-modified biomass | 92 | Deng et al., *Environ. Sci. Technol.* 39 (2005) |
| | TA-HTC | 81 | Anirudhan et al., *Appl. Clay Sci.* 42 (2008) |
| | H100-LDH | 85 | González et al., *Chem. Eng. J.* 269 (2015) |
| | EDTA-LDH | 71 | Luo et al., *Chem. Eng.* 4 (2016) |
| | Fe—$MoS_4$ | 117 | Jawad et al., *ACS Appl. Mater. Interfaces* 9 (2017) |
| | Sx-LDH | 127 | Ma et al., *J. Mat. Chem.* 2 (2014) |
| | PANI-PS | 171 | Alcaraz-Espinoza et al., *ACS Appl. Mater. Interfaces* 7 (2015) |
| | KMS-1 | 156 | Li et al., *J. Mol. Liq.* 200 (2014) |
| | LDH-[$Sn_2S_6$] | 978 | — |
| | $Mo_3S_{13}$-ppy | 408 | Yuan et al., *J. Am. Chem. Soc.* 142 (2020) |
| | Ni/Fe/Ti—$MoS_4$-LDH | 856 | Rathee et al., *RSC Adv.* 10 (2020) |
| | Mn—$MoS_4$ | 564 | Ali et al., *Chem. Eng. J.* 332 (2018) |
| $Ag^+$ | $MoS_4$-Ppy | 480 (pH ≈ 5) 725 (pH ≈ 1) | Xie et al., *Adv. Funct. Mater.* 28 (2018) |
| | $MoS_4$-LDH | 450 | Ma et al., *J. Am. Chem. Soc.* 138 (2016) |
| | Sx-LDH | 383 | Ma et al., *J. Mat. Chem.* 2 (2014) |
| | KMS-2 | 408 | Fard et al., *Chem. Mater.* 27 (2015) |
| | Fe—$MoS_4$ | 565 | Jawad et al., *ACS Appl. Mater. Interfaces* 9 (2017) |
| $Cd^2$ | LDH-[$Sn_2S_6$] | 332 | — |
| | DPA-LDH | 258 | Asiabi et al., *Chem. Eng. J.* 323 (2017) |
| | Biomass based hydrogel | 161 | Zhang et al., *Sci. Rep*, 10 (2020) |
| | $NH_2$-Functionalized Zr-MOFs | 177 | Wang et al., *Ind. Eng. Chem. Res.* 56 (2017) |
| | Polysulfide-LDH | 57 | Ma et al., *J. Mat. Chem.* 2 (2014). |
| $Pb^{2+}$ | LDH-[$Sn_2S_6$] | 579 | — |
| | MOF/polydopamine | 394 | Sun et al., *ACS Cent. Sci.* 4 (2018) |
| | $MoS_4$-LDH | 290 | Ma et al., *J. Am. Chem. Soc.* 138 (2016) |
| | Mn—$MoS_4$ | 357 | Ali et al., *Chem. Eng. J.* 332 (2018) |
| | Fe—$MoS_4$ | 345 | Jawad et al., *ACS Appl. Mater. Interfaces* 9 (2017) |
| | EDTA-LDH | 180 | Ogawa et al, *Chem. Lett.* 33(2004). |
| | Cellulose based charcogel | 240 | Alatalo et al., *ACS Appl. Mater. Interfaces* 7 (2015) |
| | Biomass based hydrogel | 422.7 | Zhang et al., *Sci. Rep*, 10 (2020) |
| $Hg^{2+}$ | LDH-[$Sn_2S_6$] | 666 | — |
| | $MoS_4$-LDH | 500 | Ma et al., J. *Am. Chem. Soc.* 138 (2016) |
| | Mn—$MoS_4$ | 594 | Ali et al., *Chem. Eng. J.* 332 (2018) |
| | Fe—$MoS_4$ | 582 | Jawad et al., *ACS Appl. Mater. Interfaces* 9 (2017) |
| | MOF/PDA | 1634 | Sun et al., *ACS Cent. Sci.* 4 (2018) |
| | KMS-2 | 297 | Fard et al., *Chem. Mater.* 27 (2015) |
| | $MoS_4$-Ppy | 210 | Xie et al., *Adv. Funct. Mater.* 28 (2018) |
| | KMS-1 | 377 | Manos et al., *Adv. Funct. Mater.* 19 (2009) |

Example 7

After the experiments of the previously introduced Example 1 were conducted, the solid sorbents were collected, dried, and analyzed by SEM-EDS, XRD, and XPS. SEM images (see FIGS. 8A-10E) show that retention of the plate-like hexagonal morphology of the LDH-[$Sn_2S_6$] crystallites is related to the concentrations of the $M^{n+}$. For example, after treating the samples at concentrations of about 10 ppm and about 100 ppm, the adsorbates seem to maintain the plate-like morphology, as shown in FIGS. 8A-8E and FIGS. 9A-9E, respectively. This may indicate that the layered structure still dominates after cation sorption. In contrast, at concentrations of about 1500 ppm of $M^{n+}$, the plate-like morphology of the LDH-[$Sn_2S_6$] is absent, as shown in FIGS. 10A-10E. Instead, the SEM images show the formation of aggregated nanoparticles. EDS analyses of LDH-$Sn_2S_6$ treated with $M^{n+}$ show that the quantity of the metal cation increases with the increase of the initial concentrations of the respective metal ions.

Tables 8-12 below detail the atomic compositions of the LDH-$Sn_2S_6$ at concertation after the adsorption of 10, 100 and 1500 ppm of solutions spiked with the respective ions. Specifically, Table 8 details the atomic compositions of the LDH-$Sn_2S_6$ at concertation after the adsorption of 10, 100 and 1500 ppm of $Cu^{2+}$ spiked solutions. Table 9 details the atomic compositions of the LDH-$Sn_2S_6$ at concertation after the adsorption of 10, 100 and 1500 ppm of $Ag^+$ spiked solutions. Table 10 details the atomic compositions of the LDH-$Sn_2S_6$ at concertation after the adsorption of 10, 100 and 1500 ppm of $Cd^{2+}$ spiked solutions. Table 11 details the atomic compositions of the LDH-$Sn_2S_6$ at concertation after the adsorption of 10, 100 and 1500 ppm of $Pb^{2+}$ spiked solutions, and Table 12 details the atomic compositions of the LDH-$Sn_2S_6$ at concertation after the adsorption of 10, 100 and 1500 ppm of $Hg^{2+}$ spiked solutions.

TABLE 8

| Atom | 10 ppm Atom % | 100 ppm Atom % | 1500 ppm Atom % |
|---|---|---|---|
| Mg | 40.54 | 38.97 | 22.74 |
| Al | 30.01 | 24.85 | 18.40 |
| S | 17.87 | 20.41 | 10.42 |
| Cu | 2.69 | 8.50 | 42.38 |
| Sn | 8.90 | 7.27 | 6.06 |
| Total | 100.00 | 100.00 | 100.00 |

TABLE 9

| Atom | 10 ppm Atom % | 100 ppm Atom % | 1500 ppm Atom % |
|---|---|---|---|
| Mg | 43.73 | 38.26 | 9.01 |
| Al | 30.98 | 31.06 | 10.27 |
| S | 16.77 | 15.09 | 14.52 |
| Ag | 1.41 | 8.09 | 61.21 |
| Sn | 7.11 | 7.49 | 4.99 |
| Total | 100.00 | 100.00 | 100.00 |

TABLE 10

| Atom | 10 ppm Atom % | 100 ppm Atom % | 1500 ppm Atom % |
|---|---|---|---|
| Mg | 42.72 | 44.81 | 15.10 |
| Al | 34.42 | 24.52 | 14.24 |
| S | 16.14 | 16.80 | 17.75 |
| Cd | 1.37 | 7.91 | 44.30 |
| Sn | 5.63 | 5.96 | 8.62 |
| Total | 100.00 | 100.00 | 100.00 |

TABLE 11

| Atom | 10 ppm Atom % | 100 ppm Atom % | 1500 ppm Atom % |
|---|---|---|---|
| Mg | 42.58 | 44.79 | 20.62 |
| Al | 29.53 | 27.62 | 24.72 |
| S | 17.63 | 14.18 | 10.77 |
| Pb | 1.10 | 7.87 | 30.43 |
| Sn | 9.16 | 5.54 | 13.46 |
| Total | 100.00 | 100.00 | 100.00 |

TABLE 12

| Atom | 10 ppm Atom % | 100 ppm Atom % | 1500 ppm Atom % |
|---|---|---|---|
| Mg | 42.41 | 23.97 | 18.60 |
| Al | 30.93 | 33.44 | 9.36 |
| S | 14.37 | 25.93 | 24.11 |
| Sn | 10.15 | 9.60 | 4.76 |
| Hg | 2.14 | 7.05 | 43.18 |
| Total | 100.00 | 100.00 | 100.00 |

The adsorption of $M^{n+}$ was achieved at different concentrations in the range of about 100 ppb to about 1500 ppm. As detailed in Tables 8-12, at a concentration of about 100 ppb, the basal space of post-adsorbed LDH-[$Sn_2S_6$] expands from about 1.08 nm to about 1.10 nm for $Pb^{2+}$ and $Cd^{2+}$ and to about 1.09 nm for $Ag^+$, $Cu^{2+}$ and $Hg^{2+}$. This suggests that, at such an extremely low concentration, the interlayer $Sn_2S_6^{4-}$ anions holds the $M^{n+}$ cations and the structure of LDH-[$Sn_2S_6$] dominates.

Figure 11:
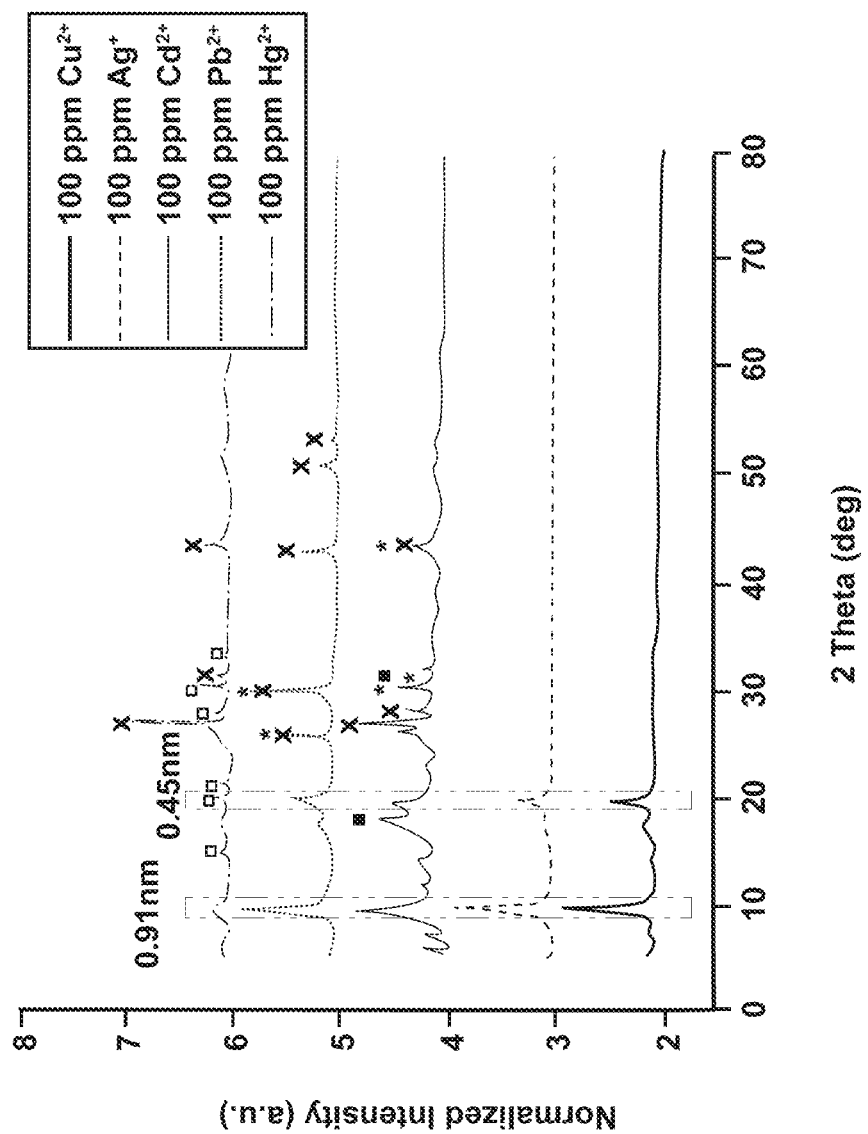
FIG. 11 shows a graphical representation of X-ray powder diffraction patterns of $M^{n+}$ sorbed LDH-$Sn_2S_6$ at 100 ppm showing the presence of 003 and 006 planes of at 0.91 and 0.45 nm, meaning the regeneration of LDH-$NO_3$.

FIG. 11 generally shows X-ray powder diffraction patterns of $M^{n+}$ sorbed LDH-$Sn_2S_6$ at 100 ppm showing the presence of 003 and 006 planes of at 0.91 and 0.45 nm, meaning the regeneration of LDH-$NO_3$. The symbols used in the graph of FIG. 11 generally correspond to $\cdot HgSO_4$, ×CdS, PbS, HgS; $\cdot Cd_2(OH)_2SO_4$; and *$CuSO_4$; $CdSO_4$, and $PbSO_4$. At 10 ppm of the $M^{n+}$ solutions, the (003) Bragg peak shifts from 1.08 to ~0.91 nm which is equivalent to that of the LDH-$NO_3$. The shift shown in the graphical representation of the X-ray powder diffraction patterns of $M^{n+}$ sorbed LDH-$Sn_2S_6$ suggests that, at this concentration, the LDH-$NO_3$ regenerates by the exchange of $Sn_2S_6$ anions. The nitrate anions are present in solution as the anion of the $M^{n+}$ salts used adsorption study. The presence of the (00l) peaks in the XRD diffraction patterns of the 100 ppm $M^{n+}$ adsorbed samples shows that they keep the nitrate intercalated LDH structure. SEM images confirm the retention of the hexagonal morphology of the crystallites at these concentrations. XRD patterns of the $M^{n+}$ adsorbed samples at concentrations ≥1000 ppm show the absence of the layered structures of LDH. This may suggest that the LDH structure does not sustain at such extremely high metal concentrations.

Figure 12:
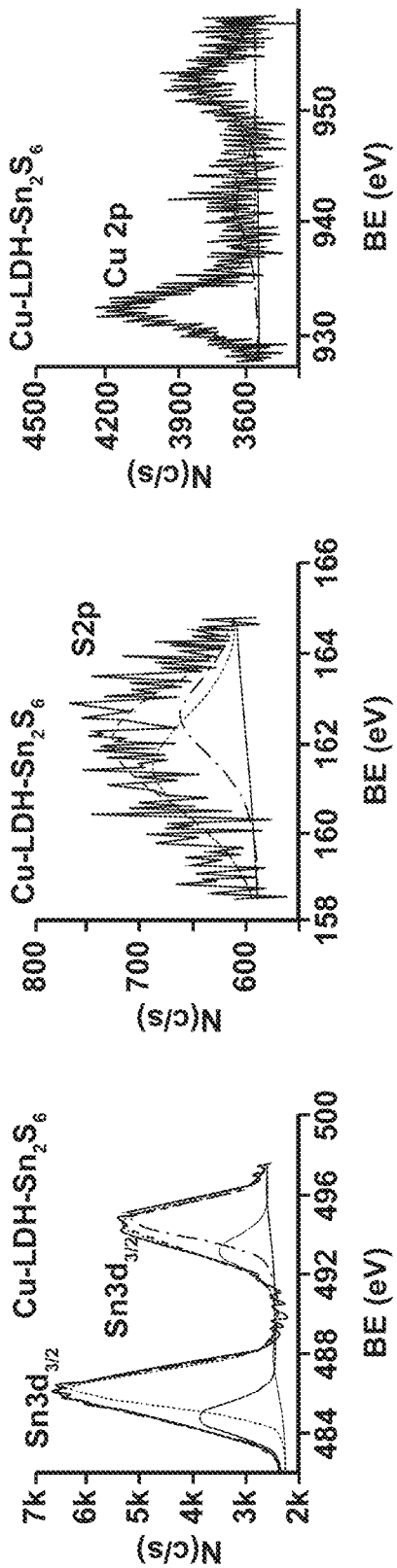
FIG. 12 shows a graphical representation of X-ray photoelectron spectra of LDH-[$Sn_2S_6$] after the adsorption of 100 ppm $Cu^{2+}$.
Figure 13:
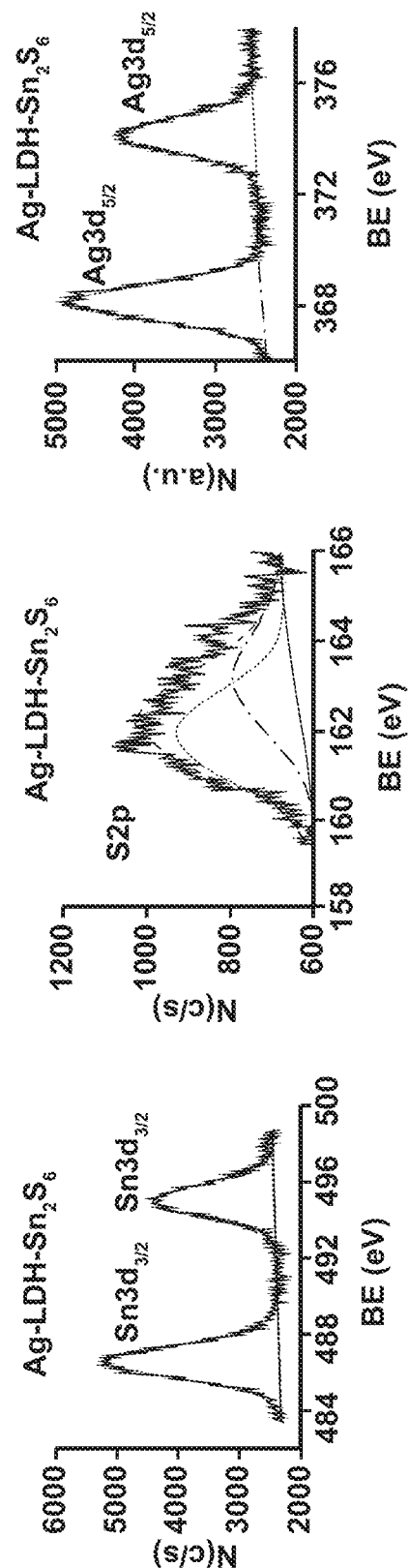
FIG. 13 shows a graphical representation of X-ray photoelectron spectra of LDH-[$Sn_2S_6$] after the adsorption of 100 ppm $Ag^+$.
Figure 14:
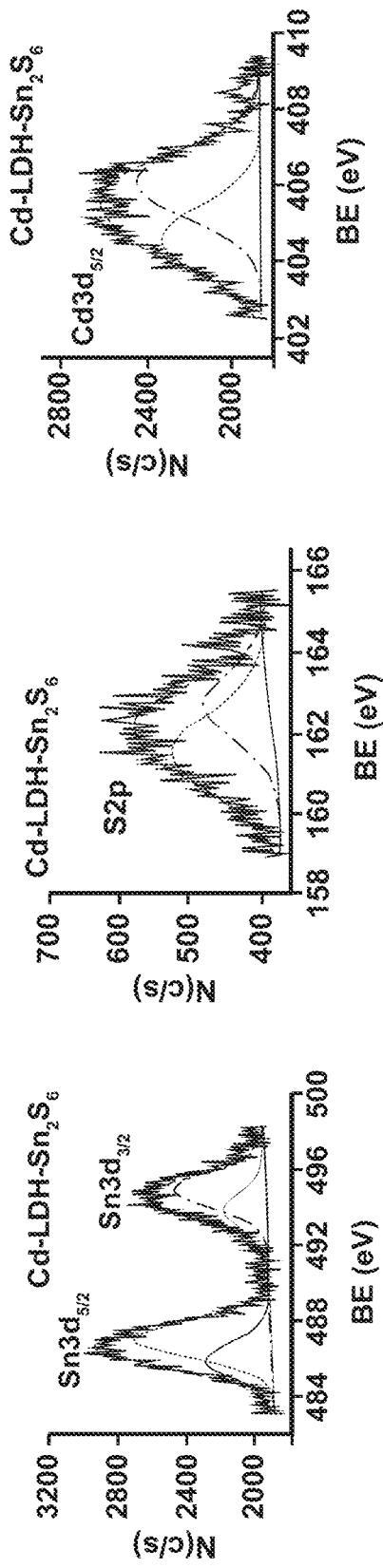
FIG. 14 shows a graphical representation of X-ray photoelectron spectra of LDH-[$Sn_2S_6$] after the adsorption of 100 ppm $Cd^{2+}$.
Figure 15:
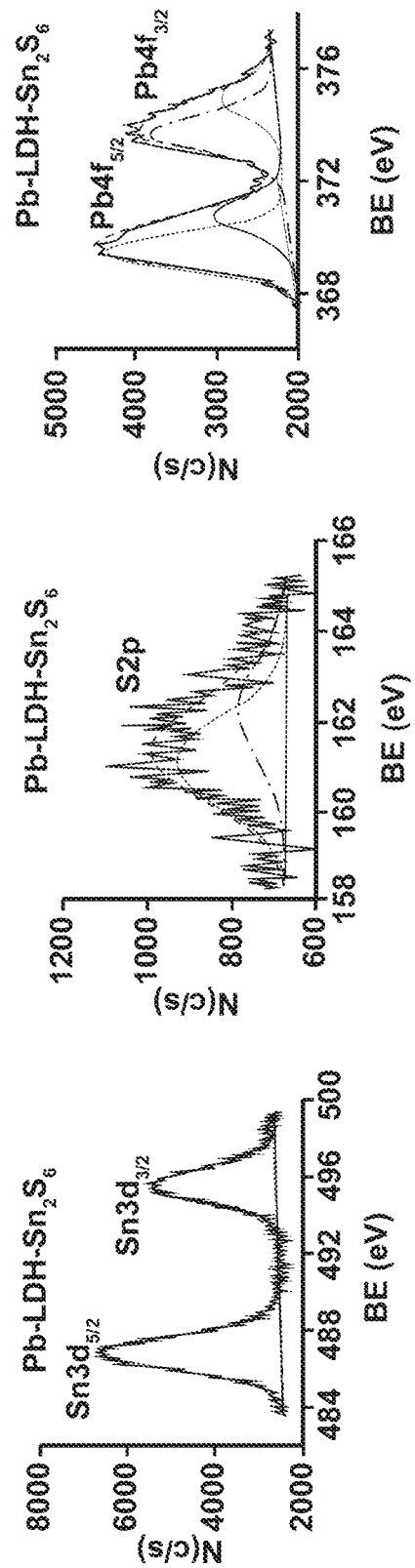
FIG. 15 shows a graphical representation of X-ray photoelectron spectra of LDH-[$Sn_2S_6$] after the adsorption of 100 ppm $Pb^{2+}$.
Figure 16:
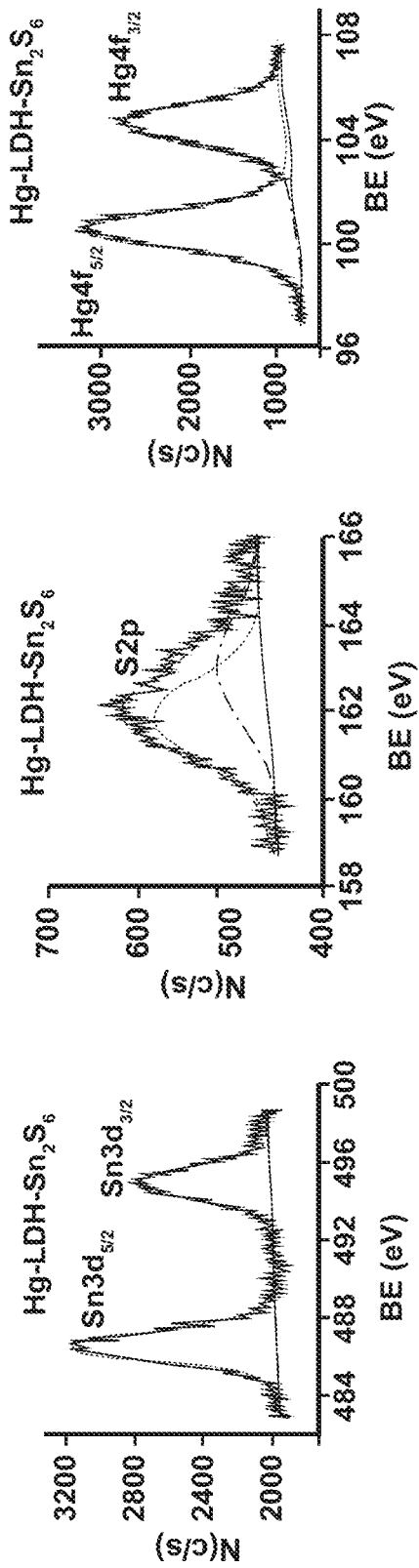
FIG. 16 shows a graphical representation of X-ray photoelectron spectra of LDH-[$Sn_2S_6$] after the adsorption of 100 ppm $Hg^{2+}$.

X-ray photoelectron spectroscopy (XPS) was conducted to determine the surface compositions and the chemical states of the post-adsorbed samples from 100 ppm solutions of $Cu^{2+}$, $Ag^+$, $Cd^{2+}$, $Pb^{2+}$, and $Hg^{2+}$. XPS of the $Cu^{2+}$, $Ag^+$, $Cd^{2+}$, $Pb^{2+}$, and $Hg^{2+}$ adsorbed samples show the presence of these metals. For the $Cu^{2+}$ adsorbed sample, the XPS results illustrated in FIG. 12 show the bands centered at about 932.3 eV and about 952.5 eV, which correspond to the Cu 2p energy of the LDH-[$Sn_2S_6$]. For the $Ag^+$ adsorbed sample shown in FIG. 13, two bands centered at about 368.2 eV and about 374.11 eV can be assigned to Ag $3d^{5/2}$ and $3d^{3/2}$, respectively. Referring to FIG. 14, the bands centered at about 404.6 eV and about 406.1 eV correspond to Cd $3d^{5/2}$ and $3d^{3/2}$ obtained from the $Cd^{2+}$ adsorbed sample. For the $Pb^{2+}$ adsorbed sample shown in FIG. 15, deconvolution of the peaks shows bands centered at about 137.67 eV/about 139.10 eV and about 142.50 eV/about 143.95 eV, respectively. These peaks originate from the $4f^{7/2}$ and $4f^{5/2}$ binding energies of $Pb^{2+}$. The energies of about 137.67 eV and about 142.50 eV ($4f^{7/2}$ and $4f^{5/2}$) correspond to the $Pb^{2+}$ of PbS, while the energies of above 139.10 eV and about 143.95 eV may originate from the $4f^{7/2}$ and $4f^{5/2}$ of $Pb^{2+}$ with a different chemical environment, probably in the vicinity of the oxides. The $Hg^{2+}$-adsorbed sample shown in FIG. 16 shows binding energies at about 100.51 eV and about 104.60 eV, which can be assigned as Hg $4f^{7/2}$ and $4f^{52}$, respectively.

All the post-adsorption samples revealed Sn 3d bands in the range of about 483 eV to about 495 eV. Deconvolution of the Sn 3d bands of Cu and Cd adsorbed samples yielded two sets of energy bands at about 484.76 eV/about 493.21 eV and about 486.29 eV/about 494.67 eV for Cu and at about 486.12 eV/about 494.46 eV and about 487.26 eV/about 495.71 eV for Cd. For the $Ag^+$, $Pb^{2+}$, and $Hg^{2+}$ adsorbed samples, only one set of bands of Sn 3d ($3d^{5/2}$, $3d^{3/2}$) was observed. These bands are centered at about 486.61 eV/about 495.06 eV for $Ag^+$, at about 486.88 eV/about 495.2 eV for $Pb^{2+}$, and at about 486.65 eV/about 495.07 eV for $Hg^{2+}$. The deviation of the binding energy of Sn 3d can be attributed to the diverse chemical environment of $Sn^{4+}$ cations. Moreover, the deconvoluted spectra of S 2p of the post adsorptions samples exhibit the binding energies of about 161.45 eV and about 162.65 eV for $Cu^{2+}$, about 161.86 eV and about 163.08 eV for $Ag^+$, about 161.52 eV and about 162.70 eV for $Cd^{2+}$, about 161.01 eV and about 162.23 eV for $Pb^{2+}$, and about 161.82 eV and about 163.07 for $Hg^{2+}$. These values are shifted from the S 2p peaks of the pristine LDH-[$Sn_2S_6$] with the binding energies in the range of about 158.16 eV to about 161.54 eV. These results suggest that there is a notable change in the electronic states possibly attributed to the partial oxidation of $S^{2-}$ and/formation of metal-sulfides.

Example 8

To assess the effects of the high concentrations of the cations and anions as well as the feasibility of LDH-[$Sn_2S_6$] to use for wastewater treatment, the heavy metal uptake kinetics, selectivity, and efficiencies for tap and Mississippi river water were studied. The results are detailed in Table 7 below. The experiments utilized about 0.01 g of LDH-[$Sn_2S_6$] and a volume of water of about 10 mL, resulting in v/m=1000 mL/g. The pH for the samples of the experiment was about 7.

Figure 17A:
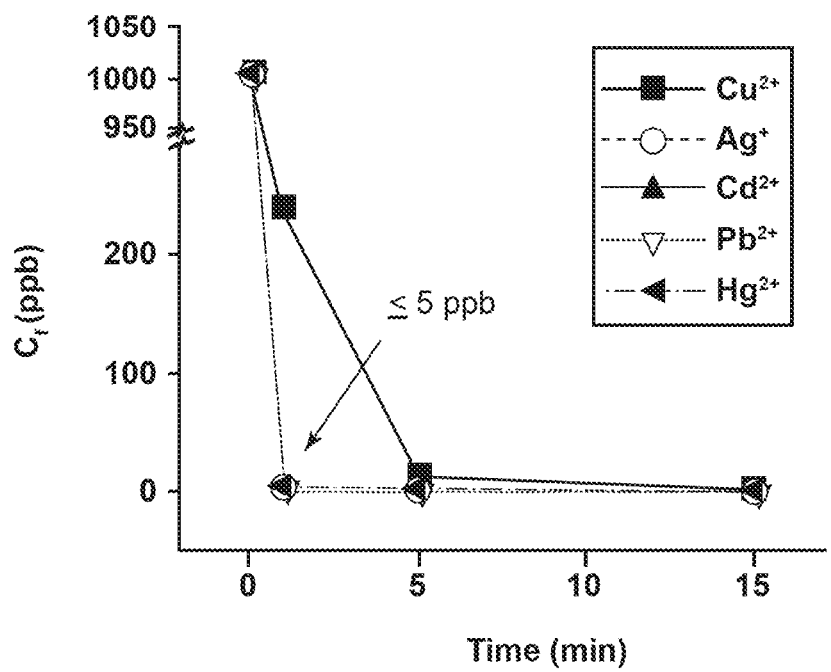
FIG. 17A shows a graphical representation of concurrent adsorption kinetics curves of $Cu^{2+}$, $Ag^+$, $Cd^{2+}$, $Pb^{2+}$, and $Hg^{2+}$ obtained in a tap water solution sample.

To perform this experiment, tap water was spiked with a mixture of $Co^{2+}$, $Ni^{2+}$, $Cu^{2+}$, $Zn^{2+}$, $Cd^{2+}$, $Pb^{2+}$, and $Hg^{2+}$ at a concentration of 1 ppm, (1000 ppb; 8000 ppb in total). Water was also collected from the Mississippi River near Louisiana. It was determined that the water included the presence of major background ions of $Ca^{2+}$, $Mg^{2+}$, $Na^+$, $Cl^-$, $CO_3^{2-}$, $SO_4^{2-}$, $NO_3^-$ and others, as well as a variety of organic species concentration of each cations as low as ≤2 ppb with $K_d$ values remaining in the range of about $10^5$ mL/g to about $10^7$ mL/g. In comparison to $Ag^+$, $Cd^{2+}$, $Pb^{2+}$, and $Hg^{2+}$, the $Cu^{2+}$ was less selective and took about 15 minutes to reduce its concentration down to about 2 ppb. Hence, the selectivity order that can be determined from the results of this Example 8 regarding tap water is $Zn^{2+}$, $Co^{2+}$, $Ni^{2+}$<<$Cu^{2+}$<$Hg^{2+}$, $Cd^{2+}$<$Pb^{2+}$, $Ag^+$. A graph of the concurrent adsorption kinetics curves of $Cu^{2+}$, $Ag^+$, $Pb^{2+}$, $Cd^{2+}$, and $Hg^{2+}$ obtained in the tap water sample is shown in FIG. 17A.

Figure 17B:
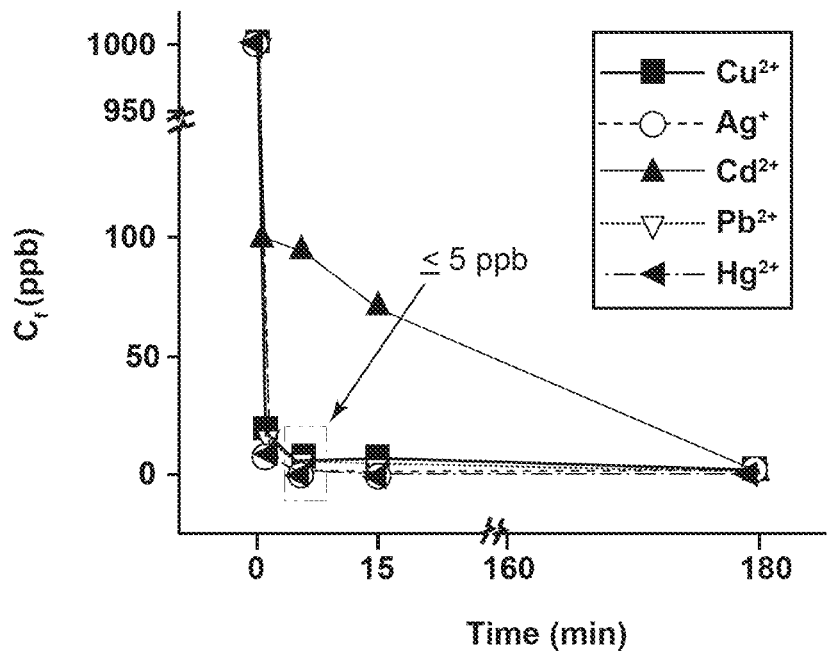
FIG. 17B shows a graphical representation of concurrent adsorption kinetics curves of $Cu^{2+}$, $Ag^+$, $Cd^{2+}$, $Pb^{2+}$, and $Hg^{2+}$ obtained in a Mississippi River water sample.

The results of application of the LDH-[$Sn_2S_6$] material to the Mississippi River water found that in mixed-ion states of $Co^{2+}$, $Ni^{2+}$, $Cu^{2+}$, $Zn^{2+}$, $Ag^+$, $Cd^{2+}$, $Pb^{2+}$, and $Hg^{2+}$ at concentrations of 1000 ppb for each (8000 ppb in total), LDH-[$Sn_2S_6$] is an excellent adsorbent for the simultaneous capture of $Cu^{2+}$, $Ag^+$, $Pb^{2+}$, and $Hg^{2+}$ and reduces concentrations from ppm to ppb level in only five min, which satisfied the safe drinking water limits defined by the US, the EPA, and the WHO. In contrast, the adsorption kinetics of $Cd^{2+}$ was relatively slow. After about 3 hours of interactions at mixed-states, the residual concentrations of cadmium ion reach below one ppb. The results detailed in Table 13 indicated that the selectivity order for the heavy metal cations of $Zn^{2+}$, $Co^{2+}$, $Ni^{2+}$, $Cu^{2+}$, $Hg^{2+}$, $Cd^{2+}$, $Pb^{2+}$, $Ag^+$ for the Mississippi River water is $Zn^{2+}$, $Co^{2+}$, $Ni^{2+}$<<$Cd^{2+}$<$Cu^{2+}$, $Hg^{2+}$<$Pb^{2+}$, $Ag^+$. A graph of the concurrent adsorption kinetics curves of $Cu^{2+}$, $Ag^+$, $Pb^{2+}$, $Cd^{2+}$, and $Hg^{2+}$ obtained in the Mississippi River water sample is shown in FIG. 17B.

TABLE 13

| Mixed-ions | Time (min) | $C_i$ (ppm) | Tap Water | | | Mississippi River Water | | |
|---|---|---|---|---|---|---|---|---|
| | | | $C_f$ (ppm) | Removal (%) | $K_d$ (mL/g) | $C_f$ (ppm) | Removal (%) | $K_d$ (mL/g) |
| $Co^{2+}$ | <1 | 1.0 | 0.8080 | 19.13 | $2.4 \times 10^2$ | 0.9979 | 0.21 | 2.10 |
| | 5 | 1.0 | 0.6880 | 31.17 | $4.5 \times 10^2$ | 0.9501 | 4.99 | $5.3 \times 10^1$ |
| $Ni^{2+}$ | <1 | 1.0 | 0.9990 | 0.06 | $6.0 \times 10^{-1}$ | 0.9573 | 4.27 | $4.5 \times 10^1$ |
| | 5 | 1.0 | 0.9150 | 8.51 | $9.3 \times 10^1$ | 0.8961 | 10.39 | $1.2 \times 10^2$ |
| $Zn^{2+}$ | <1 | 1.0 | 0.9990 | 0.002 | $2.0 \times 10^{-2}$ | 0.9913 | 0.87 | 8.8 |
| | 5 | 1.0 | 0.8650 | 13.48 | $1.5 \times 10^2$ | 0.9902 | 0.98 | 9.9 |
| $Cu^{2+}$ | <1 | 1.0 | 0.2380 | 76.21 | $3.2 \times 10^3$ | 0.0163 | 98.37 | $6.0 \times 10^4$ |
| | 5 | 1.0 | 0.0130 | 98.74 | $7.8 \times 10^4$ | 0.0050 | 99.50 | $2.0 \times 10^5$ |
| | 15 | 1.0 | 0.0020 | 99.77 | $4.4 \times 10^5$ | 0.0062 | 99.38 | $1.6 \times 10^5$ |
| $Ag^+$ | <1 | 1.0 | 0.0001 | 99.99 | $1.0 \times 10^7$ | 0.0070 | 99.30 | $1.4 \times 10^5$ |
| | 5 | 1.0 | 0.0001 | 99.99 | $1.0 \times 10^7$ | 0.0003 | 99.97 | $3.3 \times 10^6$ |
| | 15 | 1.0 | 0.0001 | 99.99 | $1.0 \times 10^7$ | 0.0001 | 99.99 | $1.0 \times 10^7$ |
| $Cd^{2+}$ | <1 | 1.0 | 0.0040 | 99.62 | $2.6 \times 10^5$ | 0.0985 | 90.15 | $9.2 \times 10^3$ |
| | 5 | 1.0 | 0.0020 | 99.80 | $5.0 \times 10^5$ | 0.0967 | 90.33 | $9.3 \times 10^3$ |
| | 15 | 1.0 | 0.0001 | 99.99 | $1.0 \times 10^7$ | 0.0700 | 93.00 | $1.3 \times 10^4$ |
| | 180 | — | — | — | — | 0.0003 | 99.97 | $3.3 \times 10^6$ |
| $Pb^{2+}$ | <1 | 1.0 | 0.0001 | 99.99 | $1.0 \times 10^7$ | 0.0147 | 98.53 | $6.7 \times 10^4$ |
| | 5 | 1.0 | 0.0001 | 99.99 | $1.0 \times 10^7$ | 0.0066 | 99.34 | $1.5 \times 10^5$ |
| | 15 | 1.0 | 0.0001 | 99.99 | $1.0 \times 10^7$ | 0.0045 | 99.55 | $2.2 \times 10^5$ |
| | 180 | — | — | — | — | 0.0002 | 99.98 | $5.0 \times 10^6$ |
| $Hg^{2+}$ | <1 | 1.0 | 0.0049 | 99.51 | $2.0 \times 10^5$ | 0.0078 | 99.22 | $1.3 \times 10^5$ |
| | 5 | 1.0 | 0.0012 | 99.87 | $7.9 \times 10^5$ | 0.0003 | 99.97 | $3.3 \times 10^6$ |
| | 15 | 1.0 | 0.0008 | 99.92 | $1.2 \times 10^7$ | 0.0005 | 99.95 | $2.0 \times 10^6$ |

Regarding the tap water, this experiment revealed LDH-[$Sn_2S_6$] as an extremely efficient adsorbent for the concurrent removal of $Cu^{2+}$, $Pb^{2+}$, $Cd^{2+}$, and $Hg^{2+}$. More precisely, in tap water, LDH-[$Sn_2S_6$] can remove over 99.5% of $Ag^+$, $Cd^{2+}$, $Pb^{2+}$, and $Hg^{2+}$ in less than one minute. This rapid removal of cytotoxic $Cd^{2+}$, $Pb^{2+}$, and $Hg^{2+}$ led to final concentrations of each cation of ≤5 ppb in less than one minute. After five minutes, the removal capacity increased to 99.8% for $Ag^+$, $Cd^{2+}$, $Pb^{2+}$, and $Hg^{2+}$, resulting in a final

Example 9

Figure 18:
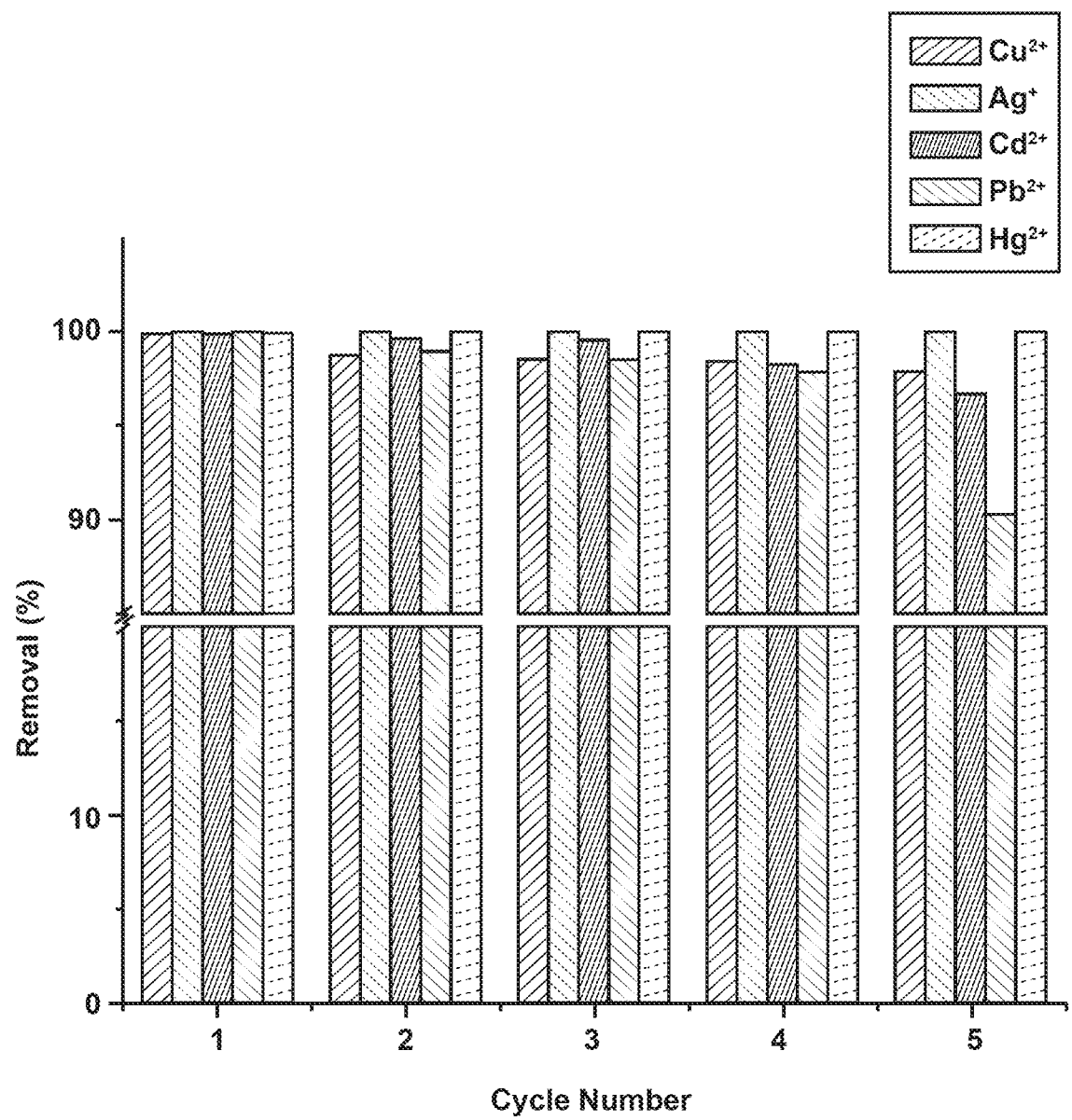
FIG. 18 shows a graphical representation of the removal rates heavy metals from a mixture of $Cu^{2+}$, $Ag^+$, $Cd^{2+}$, $Pb^{2+}$, and $Hg^{2+}$ from aqueous solutions in five consecutive cycles.

To evaluate regeneration and reusability, LDH-[$Sn_2S_6$] was investigated for the adsorption of the mixture of the solutions of $Cu^{2+}$, $Ag^+$, $Pb^{2+}$, and $Hg^{2+}$ in five consecutive cycles. These cycles were conducted using the total initial concentrations of 50 ppm of the mixed cations of $Cu^{2+}$, $Ag^+$, $Pb^{2+}$, and $Hg^{2+}$ with 10 ppm of each element for each cycle. Regeneration experiments were conducted using the 0.2 M EDTA as a complexing agent for heavy metals solutions after each cycle as described previously for Fe—MoS$_4$. The results of these cycles are detailed below in Table 14 and can be seen in the bar graph shown in FIG. 18.

TABLE 14

| Consecutive cycles | Mixed-cations | $C_i$ (ppm) | $C_f$ (ppm) | Removal (%) | $K_d$ (mL/g) |
|---|---|---|---|---|---|
| 1$^{st}$ cycle | Cu$^{2+}$ | 10 | 0.007 | 99.93 | 1.43 × 10$^6$ |
|  | Ag+ | 10 | 0.002 | 99.98 | 5.00 × 10$^6$ |
|  | Cd$^{2+}$ | 10 | 0.001 | 99.99 | 1.00 × 10$^7$ |
|  | Pb$^{2+}$ | 10 | 0.001 | 99.99 | 1.00 × 10$^7$ |
|  | Hg$^{2+}$ | 10 | 0.002 | 99.98 | 5.00 × 10$^6$ |
| 2$^{nd}$ cycle | Cu$^{2+}$ | 10 | 0.127 | 98.73 | 7.76 × 10$^4$ |
|  | Ag+ | 10 | 0.005 | 99.95 | 2.00 × 10$^6$ |
|  | Cd$^{2+}$ | 10 | 0.035 | 99.65 | 2.88 × 10$^5$ |
|  | Pb$^{2+}$ | 10 | 0.104 | 98.96 | 9.52 × 10$^4$ |
|  | Hg$^{2+}$ | 10 | 0.003 | 99.97 | 3.33 × 10$^6$ |
| 3$^{rd}$ cycle | Cu$^{2+}$ | 10 | 0.148 | 98.52 | 6.66 × 10$^4$ |
|  | Ag+ | 10 | 0.007 | 99.93 | 1.43 × 10$^6$ |
|  | Cd$^{2+}$ | 10 | 0.037 | 99.63 | 2.71 × 10$^5$ |
|  | Pb$^{2+}$ | 10 | 0.149 | 98.51 | 6.61 × 10$^4$ |
|  | Hg$^{2+}$ | 10 | 0.004 | 99.96 | 2.50 × 10$^6$ |
| 4$^{th}$ cycle | Cu$^{2+}$ | 10 | 0.161 | 98.39 | 6.12 × 10$^4$ |
|  | Ag+ | 10 | 0.008 | 99.92 | 1.25 × 10$^6$ |
|  | Cd$^{2+}$ | 10 | 0.182 | 98.18 | 5.39 × 10$^4$ |
|  | Pb$^{2+}$ | 10 | 0.223 | 97.77 | 4.39 × 10$^4$ |
|  | Hg$^{2+}$ | 10 | 0.006 | 99.94 | 1.67 × 10$^6$ |
| 5$^{th}$ cycle | Cu$^{2+}$ | 10 | 0.208 | 97.92 | 4.71 × 10$^4$ |
|  | Ag+ | 10 | 0.008 | 99.92 | 1.25 × 10$^6$ |
|  | Cd$^{2+}$ | 10 | 0.329 | 96.71 | 2.94 × 10$^4$ |
|  | Pb$^{2+}$ | 10 | 0.972 | 90.28 | 9.29 × 10$^3$ |
|  | Hg$^{2+}$ | 10 | 0.008 | 99.92 | 1.25 × 10$^6$ |

The results of Table 14 show that LDH-[Sn$_2$S$_6$] can efficiently remove Cu$^{2+}$, Ag$^+$, Cd$^{2+}$, Pb$^{2+}$, and Hg$^{2+}$ for a number of consecutive cycles. Notably, from the first through fifth cycles, LDH-[Sn$_2$S$_6$] removed over 99.9% of Ag$^+$ and Hg$^{2+}$ with $K_d$ values of about 10$^6$ mL/g. In contrast, during the fifth cycle, LDH-[Sn$_2$S$_6$] removed about 97.8% of Cu$^{2+}$, about 96.7% of Cd$^{2+}$, and about 90.3% of Pb$^{2+}$ ions. These consecutive reuse experiments show that LDH-Sn$_2$S$_6$ remains efficient for the removal of Cu$^{2+}$, Ag$^+$, Cd$^{2+}$, Pb$^{2+}$, and Hg$^{2+}$ even after five consecutive cycles.

To determine the leaching of Mg$^{2+}$, Al$^{3+}$ and Sn$^{4+}$ from the solid LDH-[Sn$_2$S$_6$] sorbent to the solutions during the adsorption of heavy metal ions, the solutions were analyzed three hours after the sorption experiments of mixed solutions of Cu$^{2+}$, Ag$^+$, Pb$^{2+}$, Cd$^{2+}$ and Hg$^{2+}$. Results of this analysis are detailed below in Table 15.

TABLE 15

| Ions | Mg$^{2+}$ | Al$^{3+}$ | Sn$^{4+}$ |
|---|---|---|---|
| Calculated concentrations of ions in the solid LDH-Sn$_2$S$_6$ before the adsorption (ppm) | 145.8 | 83.4 | 18.5 |
| Concentrations of ions in the solution after the adsorption (ppm) | 23.3 | 9.7 | 0.003 |
| Amount leached out into the solutions in percent | 16% | 11% | 0.02% |

Leaching of Sn$^{4+}$ resulted in a final solution concentration of about 0.003 ppm, which is equivalent to about 0.02% of total Sn in the LDH-[Sn$_2$S$_6$] sorbent. Greater solution concentrations were observed for Mg$^{2+}$ (about 23.3 ppm) and Al$^{3+}$ (about 9.7 ppm) corresponding to about 16% and about 11%, respectively, of the total amounts of the ions in the solid matrix of LDH-[Sn$_2$S$_6$].

The Examples above generally illustrated that the intercalation of the thiostannate anion, [Sn$_2$S$_6$]$^{4-}$, into the interlayer space of the solid-state matrix of LDHs using the chemistry of ion-exchange at ambient conditions produces a highly efficient sorbent compared to current options. The soft polarizable Lewis basic characteristics of the sulfides (S$^{2-}$) of the thiostannate anions of LDH-[Sn$_2$S$_6$] exhibit tremendously high sorption and unprecedented selectivity for a wide number of Lewis acidic heavy metal cations, including those discussed in detail elsewhere herein. The adsorption phenomena for Cu$^{2+}$, Ag$^+$, Pb$^{2+}$, and Hg$^{2+}$ can be demonstrated by the pseudo-second-order models which indicate a chemisorption process via metal sulfide bonds is involved the adsorption of M$^{n+}$ cations. The metal ion adsorption mechanism mainly includes the formation of interlayered [M$^{n+}$Sn$_2$S$_6$$^{4-}$] complex and neutral metal-sulfides and depends on the M$^{n+}$:LDH-Sn$_2$S$_6$$^{4-}$ ratio.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of producing a [Sn$_2$S$_6$]$^{4-}$ intercalated layered double hydroxide and removing heavy metal ions from a solution comprising:
   synthesizing MgAl-LDH-CO$_3$;
   synthesizing MgAl-LDH-NO$_3$ by the exchange of CO$_3$$^{2-}$ anions by NO$_3$$^-$ anions;
   synthesizing MgAl-LDH-[Sn$_2$S$_6$] by the exchange of NO$_3$$^-$ anions by [Sn$_2$S$_6$]$^{4-}$ anions,
   wherein the MgAl-LDH-[Sn$_2$S$_6$] comprises [Sn$_2$S$_6$]$^{4-}$ intercalated layered double hydroxide intercalated with a basal spacing of 1 nm±10% to about 1.10 nm±10%; and
   treating a solution comprising heavy metal ions at a pH of about 4 to 12 with MgAl-LDH-[Sn$_2$S$_6$].

2. The method of claim 1, further comprising:
   obtaining white crystals of Na$_4$Sn$_2$S$_6$·14H$_2$O from a refrigerated solution of Na$_2$S·9H$_2$O and SnCl$_4$·5H$_2$O;
   filtering and washing the crystals of Na$_4$Sn$^2$S$_6$·14H$_2$O with acetone; and
   vacuum drying the crystals of Na$_4$Sn$_2$S$_6$·14H$_2$O for about 24 hours.

3. The method of claim 1, wherein synthesizing MgAl-LDH-[Sn$_2$S$_6$] by the exchange of NO$_3$$^-$ anions by [Sn$_2$S$_6$]$^{4-}$ anions includes:
   exchanging the [Sn$_2$S$_6$]$^{4-}$ anions with the NO$_3$ anions in accordance with the equation Mg$_{0.66}$Al$_{0.34}$(OH)$_2$(NO$_3$)$_{0.34}$·0.8H$_2$O+
   0.085Na$_4$Sn$_2$S$_6$·14H$_2$O→

Mg$_{0.66}$Al$_{0.34}$(OH)$_2$(Sn$_2$S$_6$)$_{0.085}$·0.8H$_2$O+0.34NaNO$_3$

4. The method of claim 1, wherein synthesizing MgAl-LDH-[Sn$_2$S$_6$] by the exchange of NO$_3$$^-$ anions by [Sn$_2$S$_6$]$^{4-}$ anions includes:
   dispersing MgAl-LDH-NO$_3$ and Na$_4$Sn$_2$S$_6$·14H$_2$O in deionized water to form a mixture;
   stirring the mixture at ambient condition for about 24 hours;
   filtering the mixture; and retaining solids from the mixture separated by the filtering.

5. The method of claim 1, wherein synthesizing MgAl-LDH-[$Sn_2S_6$] by the exchange of $NO_3^-$ anions by [$Sn_2S_6$]$^{4-}$ anions includes:
dispersing MgAl-LDH-$NO_3$ and $Na_4Sn_2S_6 \cdot 14H_2O$ in deionized water to form a mixture;
stirring the mixture at ambient condition for about 24 hours;
filtering the mixture;
retaining solids from the mixture separated by the filtering;
washing the solids with ethanol; and
drying the solids at room temperature and pressure.

* * * * *